US010255652B2

(12) United States Patent
Featonby et al.

(10) Patent No.: US 10,255,652 B2
(45) Date of Patent: Apr. 9, 2019

(54) DYNAMIC AND APPLICATION-SPECIFIC VIRTUALIZED GRAPHICS PROCESSING

(71) Applicant: Amazon Technologies, Inc., Seattle, WA (US)

(72) Inventors: Malcolm Featonby, Sammamish, WA (US); Yuxuan Liu, Seattle, WA (US); Umesh Chandani, Seattle, WA (US); John Merrill Phillips, Jr., Seattle, WA (US); Nicholas Patrick Wilt, Mercer Island, WA (US); Adithya Bhat, Seattle, WA (US); Douglas Cotton Kurtz, Sammamish, WA (US); Mihir Sadruddin Surani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/409,482

(22) Filed: Jan. 18, 2017

(65) Prior Publication Data

US 2018/0204301 A1    Jul. 19, 2018

(51) Int. Cl.
*G06T 1/20* (2006.01)
*G06F 9/50* (2006.01)
(Continued)

(52) U.S. Cl.
CPC .............. *G06T 1/20* (2013.01); *G06F 9/445* (2013.01); *G06F 9/45558* (2013.01);
(Continued)

(58) Field of Classification Search
CPC ........... G06T 1/20; G09G 5/363; G06F 9/445; G06F 9/5011; G06F 9/5044; G06F 9/5077; G06F 9/52
(Continued)

(56) References Cited

U.S. PATENT DOCUMENTS 9,069,622 B2    6/2015  Post et al.
9,098,323 B2    8/2015  Mitra et al.
(Continued)

FOREIGN PATENT DOCUMENTS

WO    2014100558    6/2014

OTHER PUBLICATIONS

Nice, "DCV Administration Guide," NICE s.r.l, Asti, Italy, Jul. 2015, Source: https://www.nice-software.com/download/nice-dcv-2014#documentation, pp. 1-96.
(Continued)

*Primary Examiner* — Jacinta M Crawford
(74) *Attorney, Agent, or Firm* — Robert C. Kowert; Meyertons, Hood, Kivlin, Kowert & Goetzel, P.C.

(57) ABSTRACT

Methods, systems, and computer-readable media for dynamic and application-specific virtualized graphics processing are disclosed. Execution of an application is initiated on a virtual compute instance. The virtual compute instance is implemented using a server. One or more graphics processing unit (GPU) requirements associated with the execution of the application are determined. A physical GPU resource is selected from a pool of available physical GPU resources based at least in part on the one or more GPU requirements. A virtual GPU is attached to the virtual compute instance based at least in part on initiation of the execution of the application. The virtual GPU is implemented using the physical GPU resource selected from the pool and accessible to the server over a network.

20 Claims, 17 Drawing Sheets

(51) Int. Cl.
  *G06F 9/445* (2018.01)
  *G06F 9/455* (2018.01)
(52) U.S. Cl.
  CPC .......... *G06F 9/5044* (2013.01); *G06F 9/5072* (2013.01); *G06F 9/5077* (2013.01); *G06F 2209/5011* (2013.01)
(58) Field of Classification Search
  USPC .......................... 345/501, 502; 718/102, 104
  See application file for complete search history.

(56) References Cited

U.S. PATENT DOCUMENTS

| | | | |
|---|---|---|---|
| 2011/0083131 | A1 | 4/2011 | Pirzada et al. |
| 2011/0164046 | A1* | 7/2011 | Niederauer ........... G06F 1/3218 345/503 |
| 2012/0069032 | A1 | 3/2012 | Hansson et al. |
| 2012/0154389 | A1 | 6/2012 | Bohan et al. |
| 2014/0055466 | A1 | 2/2014 | Petrov et al. |
| 2014/0176583 | A1 | 6/2014 | Abiezzi et al. |
| 2014/0181806 | A1 | 6/2014 | Abiezzi et al. |
| 2014/0215462 | A1 | 7/2014 | Kuo et al. |
| 2014/0286390 | A1 | 9/2014 | Fear |
| 2015/0067672 | A1 | 3/2015 | Mitra et al. |
| 2015/0097844 | A1 | 4/2015 | Wankhede et al. |
| 2015/0116335 | A1 | 4/2015 | Chen et al. |
| 2015/0130813 | A1* | 5/2015 | Taraki .................... G06F 1/3209 345/441 |
| 2015/0220354 | A1 | 8/2015 | Nair |
| 2015/0371355 | A1* | 12/2015 | Chen ......................... G06T 1/20 345/505 |
| 2016/0247248 | A1 | 8/2016 | Ha et al. |
| 2017/0004808 | A1 | 1/2017 | Agashe et al. |

OTHER PUBLICATIONS

Federico Sala. "The rCUDA technology: an inexpensive way to improve the performance of GPU-based clusters." Talk at Computer Engineering Laboratory, Delft University of Technology. Delft, Netherlands. Apr. 2015, pp. 1-47.
U.S. Appl. No. 14/938,457, filed Nov. 11, 2015, Nicholas Patrick Wilt et al.
U.S. Appl. No. 14/938,461, filed Nov. 11, 2015, Nicholas Patrick Wilt et al.
U.S. Appl. No. 14/938,656, filed Nov. 11, 2015, Nicholas Patrick Wilt et al.
U.S. Appl. No. 14/938,654, filed Nov. 11, 2015, Nicholas Patrick Wilt et al.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
Jeff Weiss, et al., "NVIDIA Grid VCPU Deployment Guide for Vmware Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
U.S. Appl. No. 14/822,511, filed Aug. 10, 2015, Nicholas Patrick Wilt, et al.
Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.
Lin Shi, et al., "vCUDA: GPU-Accelerated High-Performance Computing in Virtual Machines", IEEE Transaction on Computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179.
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.
U.S. Appl. No. 15/178,292, filed Jun. 9, 2016, Nicholas Patrick Wilt.
U.S. Appl. No. 15/404,131, filed Jan. 11, 2017, Malcolm Featonby, et al.
International Search Report and Written Opinion from PCT/US2018/014128, dated May 15, 2018, Amazon Technologies, Inc., pp. 1-14.

\* cited by examiner

DYNAMIC AND APPLICATION-SPECIFIC VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
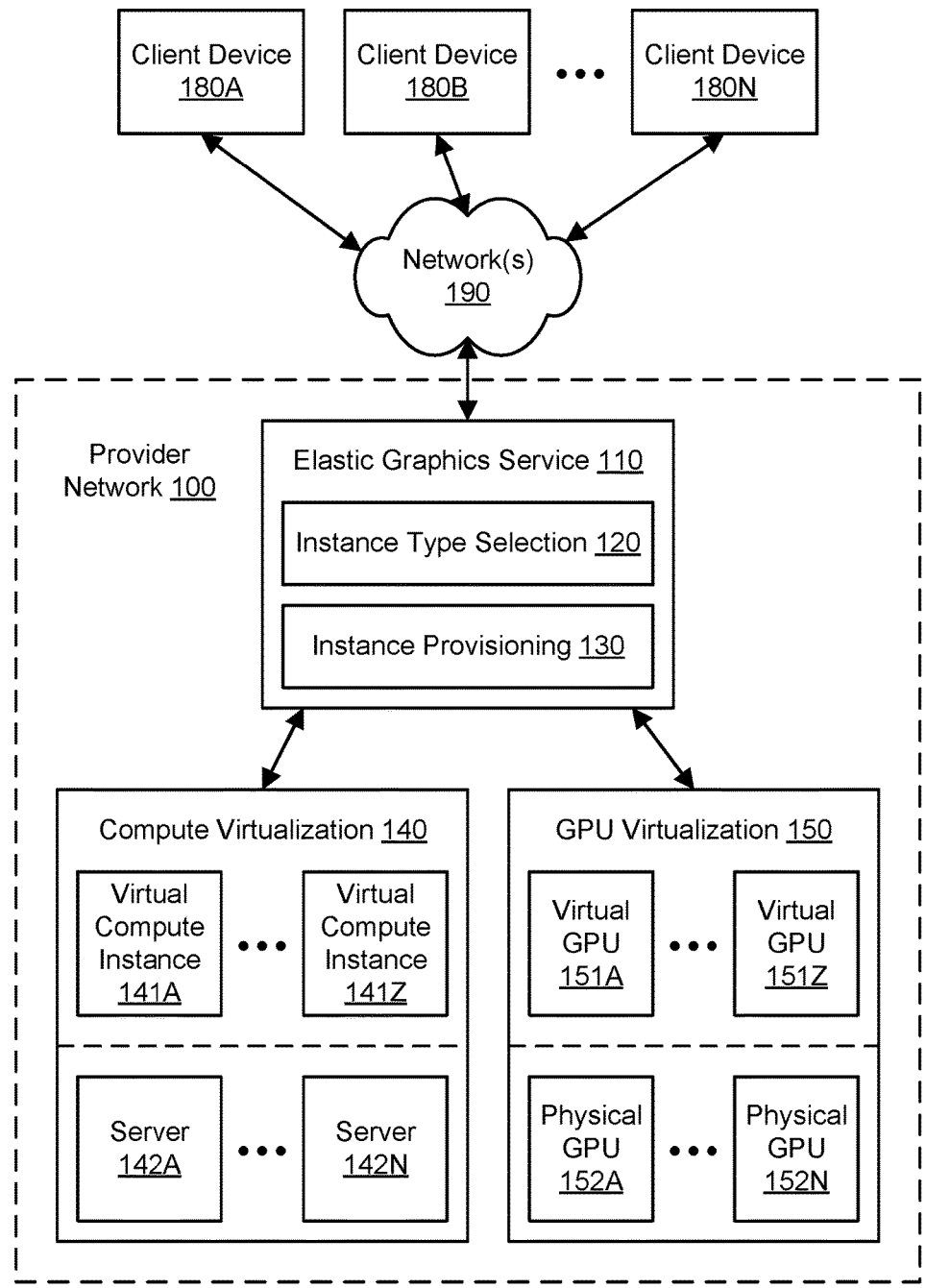
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for dynamic and application-specific virtualized graphics processing are described. A provider network may offer a pool of available physical graphics processing unit (GPU) resources. The available physical GPU resources may vary in terms of their hardware characteristics, vendor of origin, associated application programming interface (API), and/or other relevant attributes. An application on a virtual compute instance may be associated with one or more GPU requirements. The requirements may specify hardware characteristics of a GPU, a vendor of a GPU, a desired API for the GPU, and/or other relevant attributes. For example, a particular application may request a GPU having a minimum amount of memory and/or particular hardware features in order to achieve a threshold level of performance. In one embodiment, the requirements are provided by the application, e.g., using a suitable API. In one embodiment, the requirements are associated with the virtual compute instance itself, e.g., as specified in a machine image used to launch the instance. A virtual GPU may be attached to the virtual compute instance. The virtual GPU may be implemented using at least one physical GPU resource selected from the pool of available resources based (at least in part) on the requirements associated with the application. The virtual GPU may be attached during execution of the application, e.g., based (at least in part) on application launch or based (at least in part) on instructions sent by the application to a graphics API. To provide accelerated graphics processing and/or general-purpose GPU computing for the application, the physical GPU resource may communicate over a network with a server (e.g., a physical compute instance) that implements the virtual compute instance. In one embodiment, different virtual GPUs may be attached to the same instance for use by applications with different GPU requirements. In one embodiment, one or more additional virtual GPUs may be added to the same instance for use by the same application. A virtual GPU may also be detached dynamically, e.g., upon termination of the application. Using the techniques described herein, GPU resources in a provider network may be conserved and provided to clients in a cost-effective manner.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. The servers may also be referred to as physical compute instances. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110, also referred to herein as a graphics service, may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 14), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or servers or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 14.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 14:
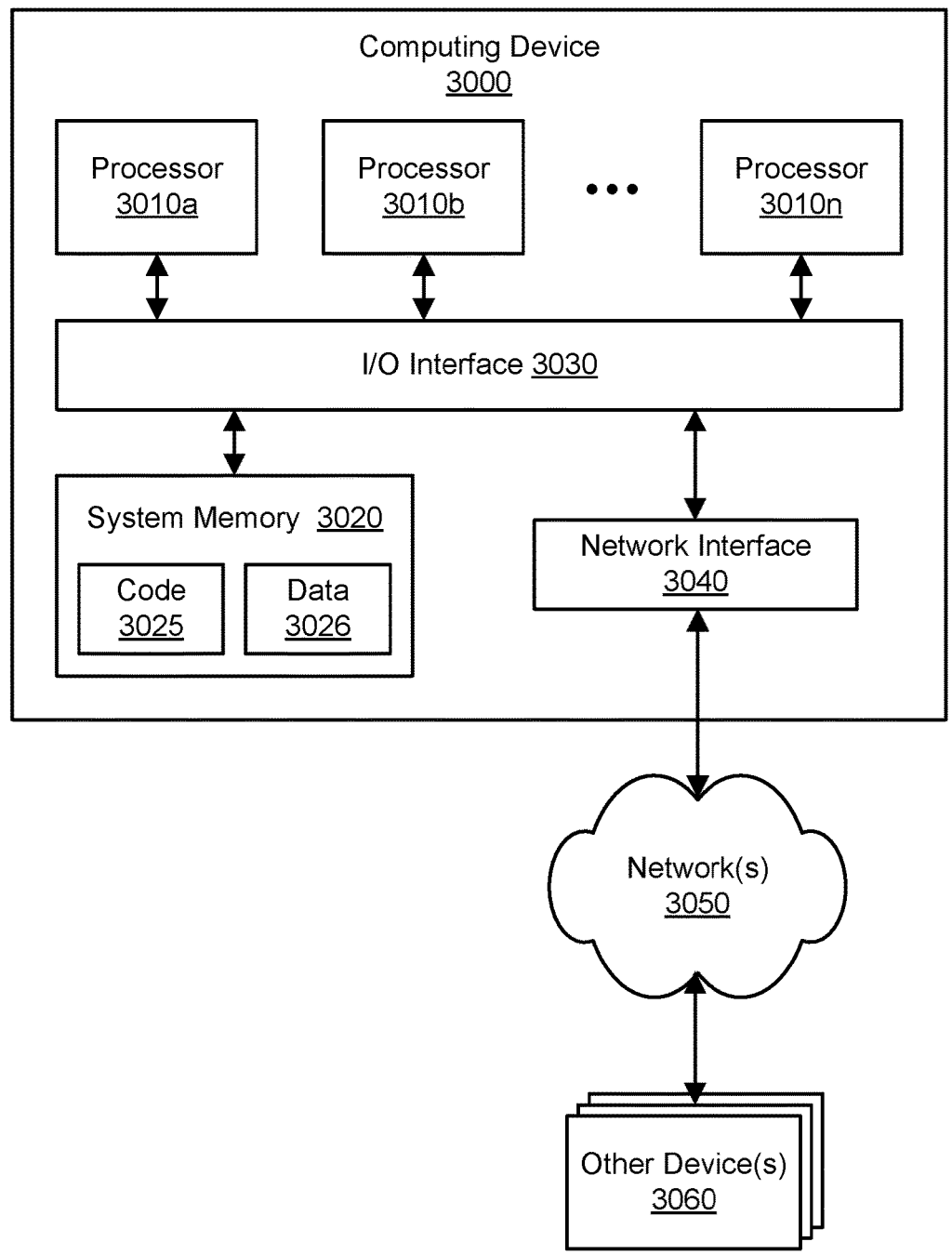
FIG. 14 illustrates an example computing device that may be used in some embodiments.

The provider network 100 may include a plurality of computing devices, any of which may be implemented by the example computing device 3000 illustrated in FIG. 14. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
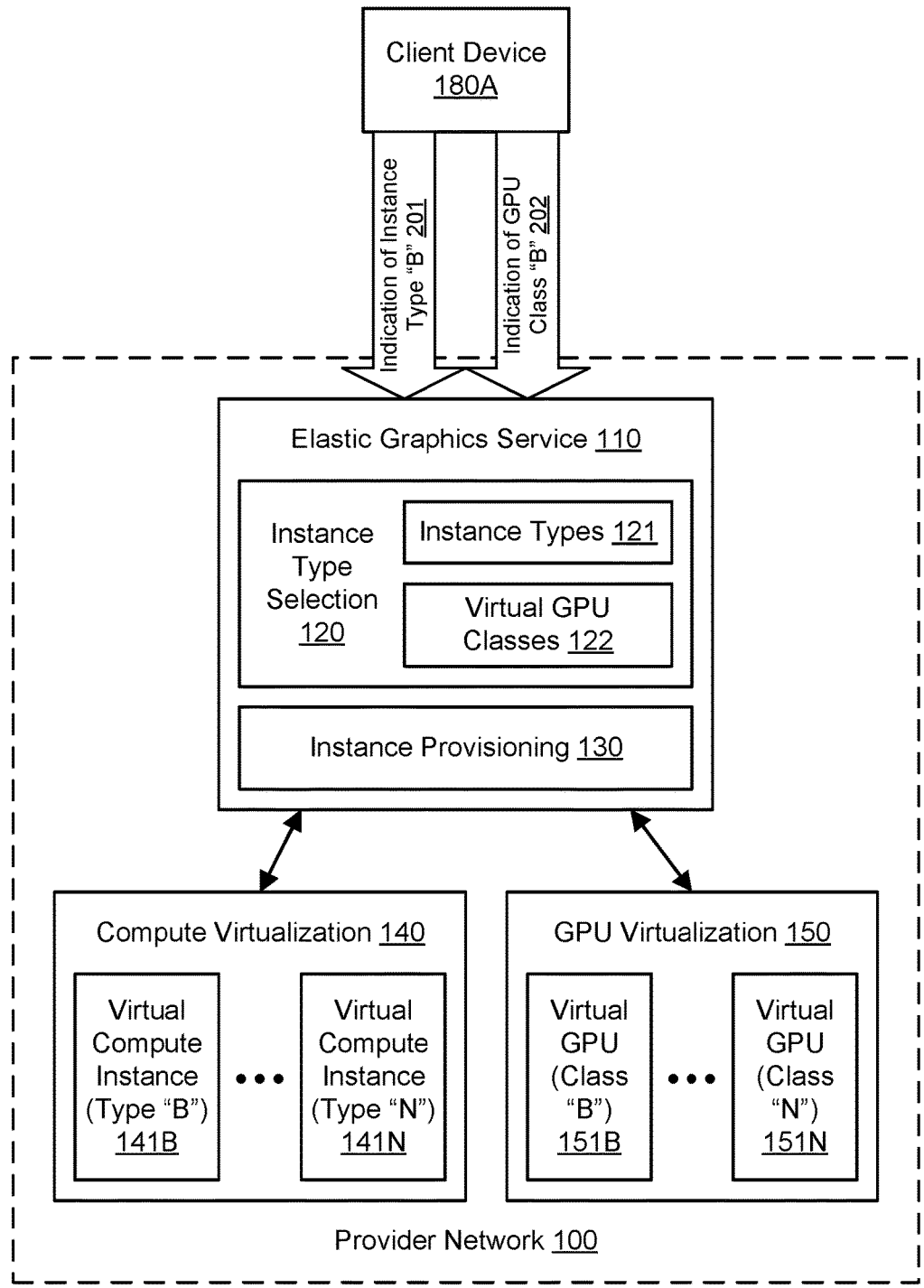
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
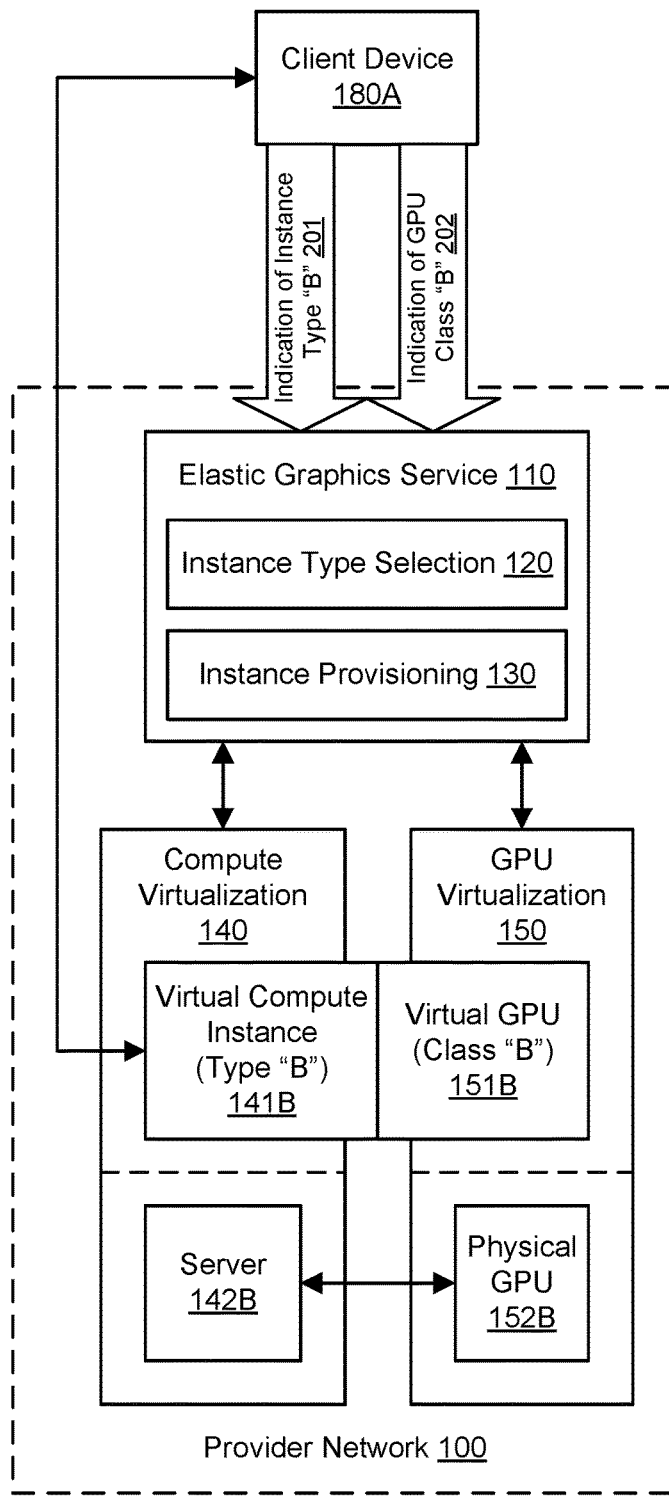
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
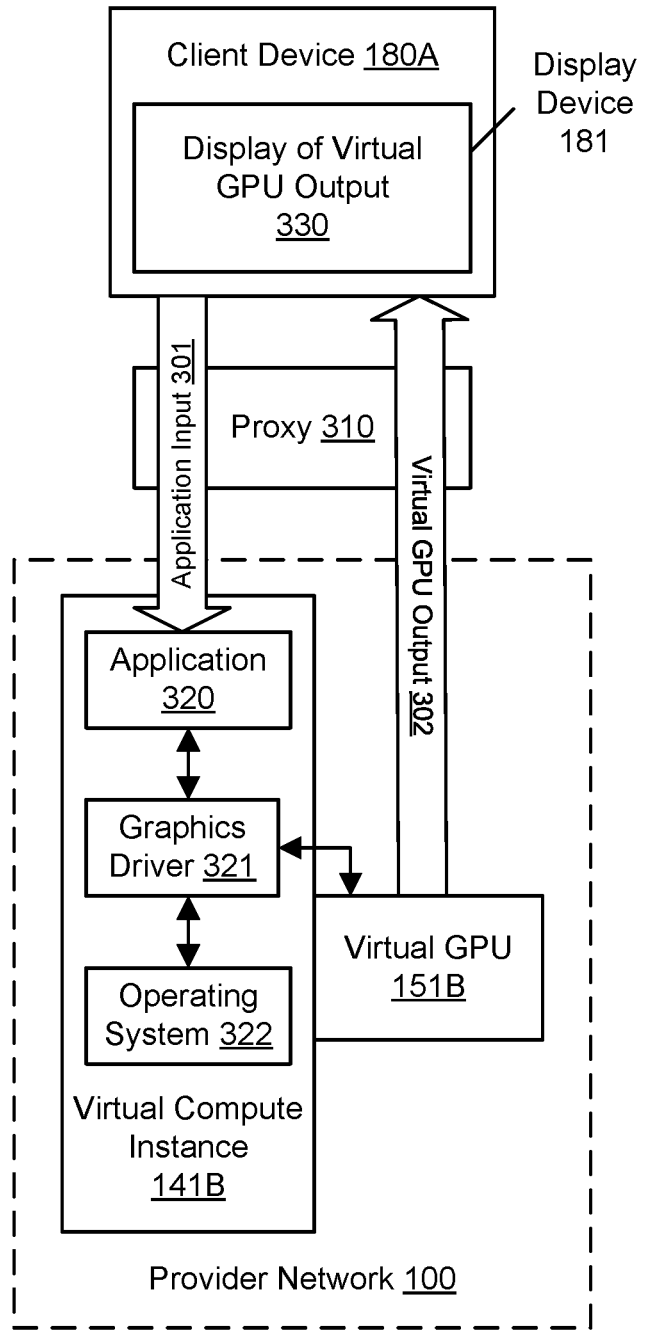
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
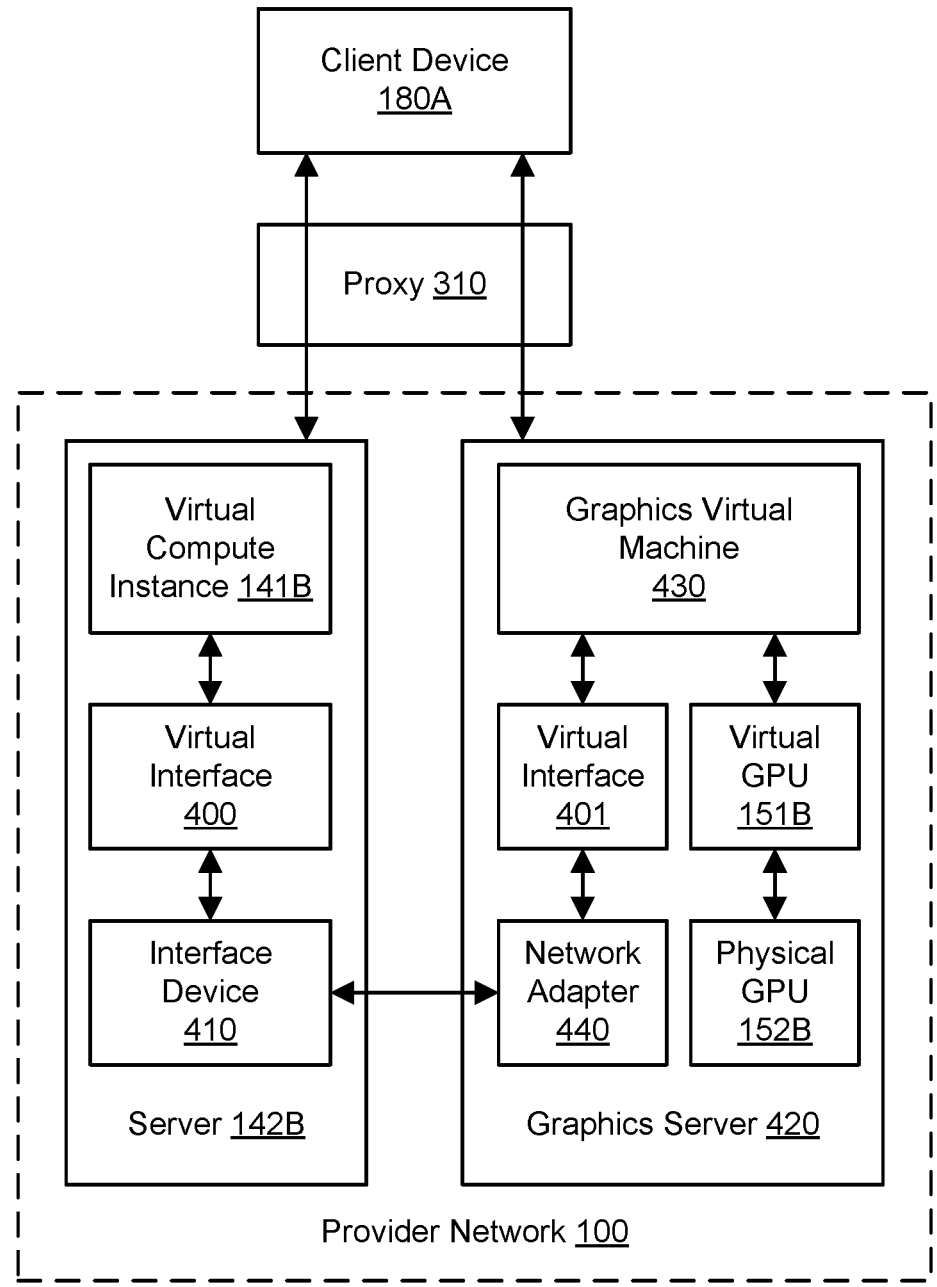
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more graphics servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the server 142B or graphics server 420.

Figure 5:
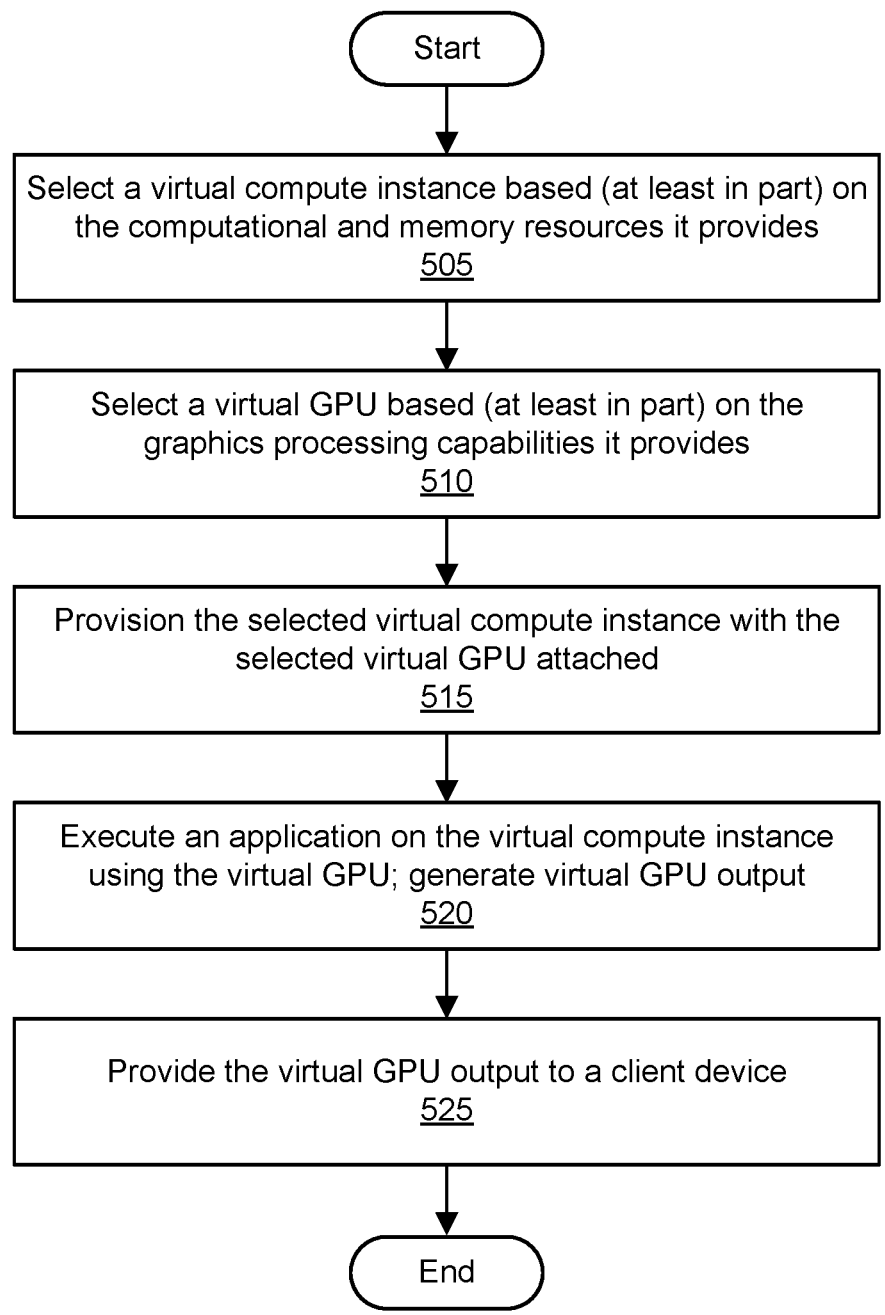
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a server. The virtual GPU may be implemented using a physical GPU. The physical GPU may be attached to a different computing device than the computing device that provides the CPU resources for the virtual compute instance. The physical GPU may be accessible to the server over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying server) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different server may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Server(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available server(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying server and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

In some embodiments, graphics overlays may be implemented with the techniques for virtualized graphics processing described herein. A virtual compute instance may be provisioned with an attached virtual GPU. In executing a particular application, the virtual compute instance may send graphics instructions to the graphics server for generating graphical output associated with the application. The graphical output may include graphical elements, including objects, pixels, and so on, as determined by execution of the graphics instructions sent from the virtual compute instance. A graphics overlay may be added to the graphical output after the graphics instructions from the virtual compute instance are received by the graphics server. The graphics overlay may include one or more additional graphical elements, and the additional graphical elements may be placed on top of (and may therefore obscure, at least partially) any of the graphical elements generated by execution of the "original" graphics instructions sent from the virtual compute instance. For example, the graphics overlay may include a display of metadata such as a current frame rate, an in-application chat window, and so on. Instead of using code injection in an application to modify or append graphics instructions to generate an overlay, the graphics overlay may be generated at the graphics server using additional graphics instructions determined at that server, at a dedicated graphics overlay server using graphical output received from the graphics server, or at the server using graphical output received from the graphics server. Using these techniques, graphical output of a virtual GPU may be modified with overlays in a trustworthy manner, e.g., without necessarily modifying an application on whose behalf the graphical output is generated.

Dynamic and Application-Specific Virtualized Graphics Processing

Figure 6A:
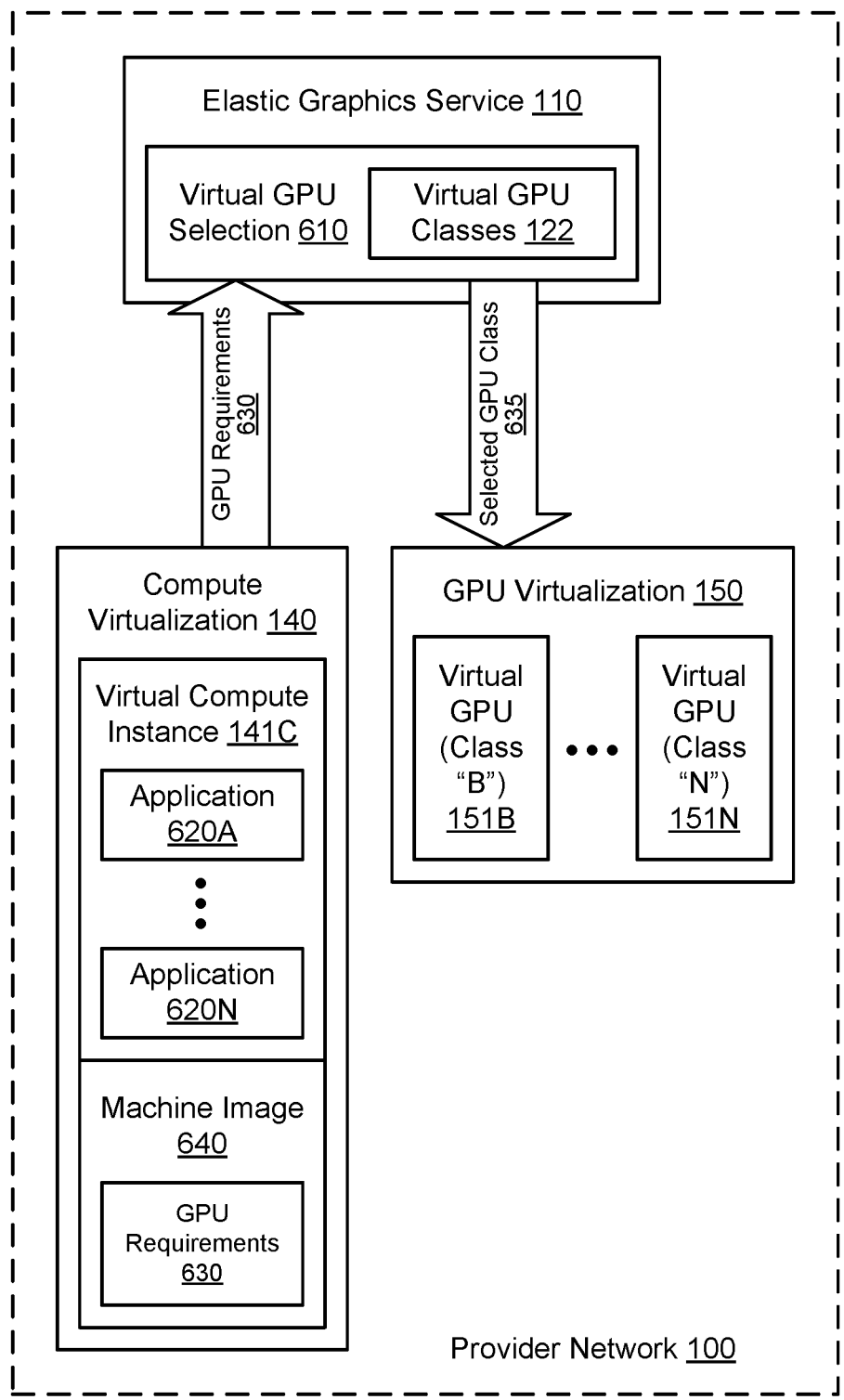
FIG. 6A illustrates an example system environment for dynamic and application-specific virtualized graphics processing, including GPU requirements specified in a machine image, according to one embodiment.
Figure 6B:
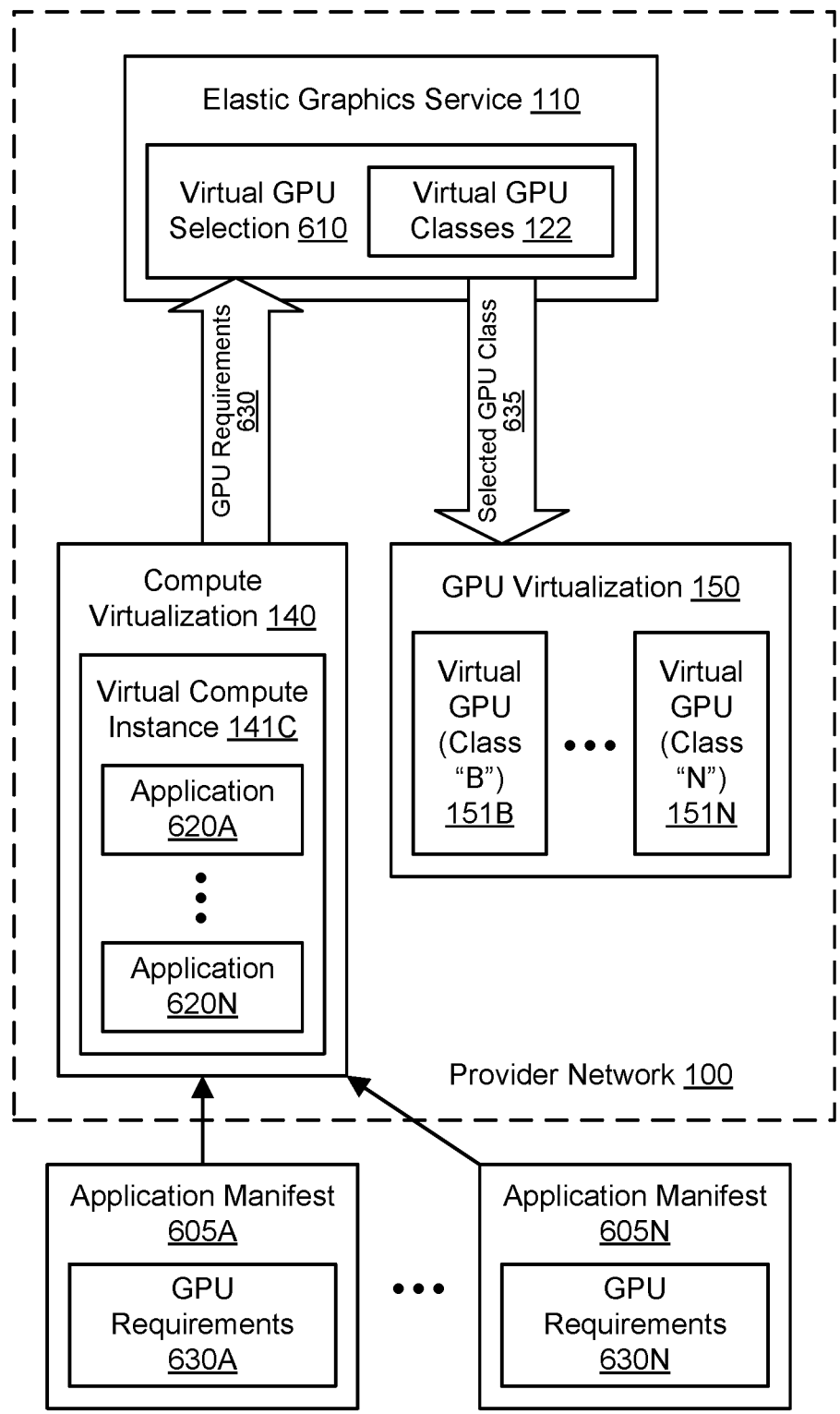
FIG. 6B illustrates an example system environment for dynamic and application-specific virtualized graphics processing, including GPU requirements specified in an application manifest, according to one embodiment.
Figure 6C:
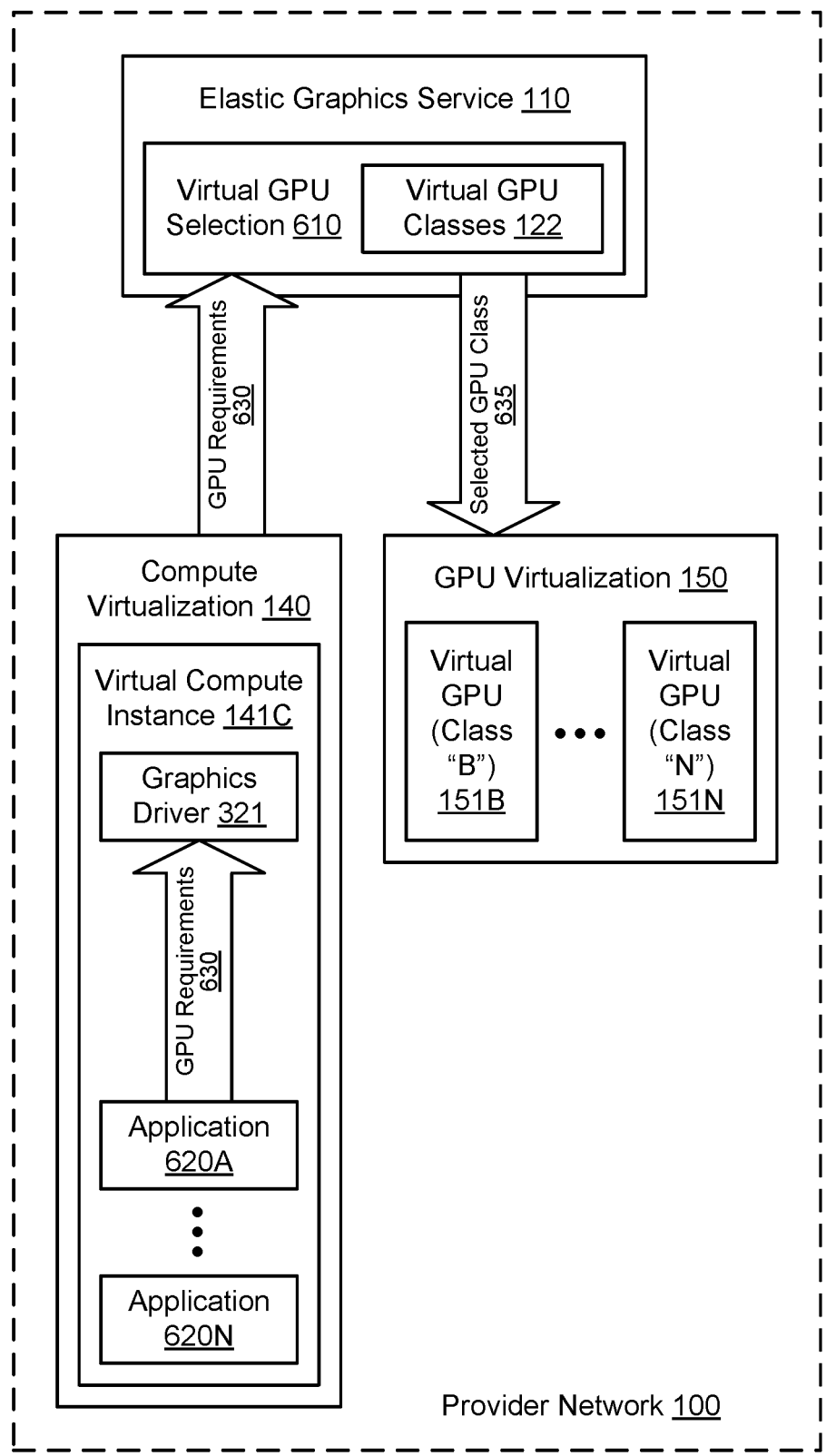
FIG. 6C illustrates an example system environment for dynamic and application-specific virtualized graphics processing, including GPU requirements specified by an application at runtime, according to one embodiment.

FIGS. 6A, 6B, and 6C illustrate example system environments for dynamic and application-specific virtualized graphics processing, according to some embodiments. In some embodiments, virtualized graphics processing may be provided on a dynamic and application-specific basis. Using the techniques discussed above for virtualized graphics processing in a provider network, a virtual compute instance 141C may be provisioned. The virtual compute instance 141C may be configured to execute one or more applications. As shown in the example of FIG. 6A, the virtual compute instance 141C may have a set of applications such as application 620A through application 620N. In various embodiments, however, a virtual compute instance may have any suitable number and configuration of applications. As used herein, the term "application" generally includes a set of program instructions, a software package, or a set of interconnected software resources designed to perform a set of coordinated functions when executed on a compute instance, often on top of an operating system resident on the compute instance.

As will be discussed in greater detail below, a virtual GPU may be selected and attached to the virtual compute instance 141C specifically for use by a particular one of the applications 620A-620N. The application-specific virtual GPU may be dynamically attached, e.g., while the particular application is executing and potentially in response to an operation performed or requested by the application. The application-specific virtual GPU may be dedicated to the particular application, and other applications running on the virtual compute instance 141C may have no access to this particular virtual GPU. In one embodiment, more than one of the applications 620A-620N on the virtual compute instance 141C may have their own dedicated virtual GPUs. The capabilities of the virtual GPUs may vary based on different GPU requirements associated with the different applications. In one embodiment, one or more other applications on the virtual compute instance 114C may not have access to any virtual GPUs, e.g., if the GPU requirements for the other applications are not sufficient to justify the cost of a virtual GPU.

The provider network 100 may offer a pool of available physical graphics processing unit (GPU) resources. The physical GPU resources may include a plurality of graphics servers (such as the graphics server 420) and/or a plurality physical GPUs contained within such graphics servers. The available physical GPU resources may vary in terms of their hardware characteristics or feature sets, vendor of origin, associated application programming interface (API) (e.g., a graphics API for accelerated graphics processing such as OpenGL or Direct3D or Vulkan or a general-purpose GPU computing API such as OpenCL), and/or other relevant attributes. Any virtual GPUs implemented using those physical GPU resources may similarly vary in such characteristics. As discussed above, virtual GPUs may be offered by the provider network 100 in various classes 122 or types, such as class "B" through class "N," that vary in one or more characteristics. In one embodiment, the virtual GPU classes may represent subdivisions of graphics processing capabilities of a physical GPU, such as a full GPU, a half GPU, a quarter GPU, and so on. A virtual GPU class may be characterized by its computational resources for graphics processing, memory resources for graphics processing, feature sets, and/or other suitable descriptive characteristics. For example, a virtual GPU 151B of class "B" may be implemented using a physical GPU that has a particular amount of video memory, while a virtual GPU 151N of class "N" may be implemented using a physical GPU that has a different amount of video memory. As another example, the virtual GPU 151B of class "B" may be accessible using one API such as a version of OpenGL, while the virtual GPU 151N of class "N" may be accessible using another API such as a version of Direct3D. As yet another example, the virtual GPU 151B of class "B" may be implemented using a physical GPU that has a particular hardware feature or capability associated with a particular GPU vendor, while the virtual GPU 151N of class "N" may lack such a hardware feature or capability.

An application on a virtual compute instance may be associated with one or more requirements associated with use of a virtual GPU, also referred to herein as graphics requirements or GPU requirements. The GPU requirements may specify one or more of the virtual GPU classes 122 offered by the provider network 100, one or more hardware characteristics of a GPU (e.g., a minimum amount of memory), a vendor of a GPU, a desired API for the GPU, and/or other relevant attributes. For example, a particular application may be associated with a requirement of a GPU having a minimum amount of memory and/or a particular hardware feature in order to achieve a threshold level of performance for the application. As another example, a particular application may be associated with a requirement of a GPU being accessible using a particular API (e.g., a graphics API for accelerated graphics processing such as OpenGL or Direct3D or a general-purpose GPU computing API such as OpenCL). The GPU requirements may be expressed as minimums, maximums, threshold values, and/or ranges of values. In one embodiment, the GPU requirements may include both minimum requirements and favored requirements (that exceed the minimum requirements) to be chosen if such capacity is available).

In one embodiment, the GPU requirements 630 associated with a particular application may be provided to the elastic graphics service 110 and used to select an appropriate application-specific virtual GPU for attachment to that application. In one embodiment, the GPU requirements 630 provided by the virtual compute instance 141C may include only an identifier of an application, and another component such as the elastic graphics server may select a virtual GPU or determine other GPU requirements based (at least in part) on the application identifier. In one embodiment, for a particular application with one or more particular GPU requirements, a virtual GPU selection component 610 of the elastic graphics service 110 may select a virtual GPU class 635 from a set of virtual GPU classes 122 for use with the application. The virtual GPU class 635 may be selected such that the one or more GPU requirements 630 are satisfied. For example, if the GPU requirements 630 indicate a minimum amount of video memory, then the virtual GPU selection component 610 may select a virtual GPU class 635 that meets or exceeds the prescribed amount of video memory. As another example, if the GPU requirements 630 merely identify the application for which virtualized GPU processing is sought, then the virtual GPU selection component 610 may select a virtual GPU class 635 that is appropriate for that application, e.g., using any appropriate metadata linking the application to additional GPU requirements. A virtual GPU of the selected class 635 may be provisioned by the elastic graphics service 110 from a pool of available resources of the provider network 100, e.g., from a pool of available physical GPU resources. The physical GPU resource used to implement the selected virtual GPU may also satisfy the one or more GPU requirements 630.

One or more of the applications 620A-620N on the virtual compute instance 141C may be associated with a set of GPU requirements 630. In various embodiments, the GPU requirements associated with a particular application may be determined in various ways. In one embodiment, the GPU requirements may be solicited from a user of an application on the virtual compute instance 141C, e.g., during execution of the application after a virtual GPU is requested. In one embodiment, when soliciting the GPU requirements from a user, the user may be presented with the different features and costs associated with two or more virtual GPUs. In one embodiment, a user of the application may specify criteria for a desired experience, such as a particular frame rate, and the specified criteria may be mapped to appropriate GPU requirements and/or a virtual GPU class.

As shown in the example of FIG. 6A, the GPU requirements 630 may be included in a machine image 640 that is used to launch or otherwise installed on the virtual compute instance 141C. The machine image 640 may include operating system software and any other configuration values used to place the virtual compute instance 141C in a state suitable for launching the applications 620A-620N. In various embodiments, the machine image 640 may also include one or more of the applications 620A-620N. In one embodiment, the GPU requirements 630 in the machine image 640 may be applicable to only one of the applications 620A-620N, e.g., such that the requirements are expressed with reference to a specific identifier of the corresponding application. In one embodiment, the same GPU requirements 630 in the machine image 640 may be applicable to more than one of the applications 620A-620N. In one embodiment, different GPU requirements 630 in the machine image 640 may be applicable to different ones of the applications 620A-620N. The GPU requirements 630 originally contained in the machine image 640 may be provided to the elastic graphics service 110 for selection and attachment of an application-specific virtual GPU at any suitable point in time.

As shown in the example of FIG. 6B, the GPU requirements 630 may be included in one or more application manifests associated with the applications 620A-620N. For example, the application 620A may be associated with an application manifest 605A that describes GPU requirements 630A specifically associated with that application, while another application 620N may be associated with another application manifest 605N that describes GPU requirements 630N specifically associated with that other application. An application manifest 605A-605N may specify required or recommended characteristics of a platform (e.g., computational and memory requirements) or environment for executing the corresponding application, potentially including characteristics of a server or virtual compute instance. The application manifest 605A-605N may be determined and provided by a developer of the corresponding application who seeks a degree of control over the type of platform or environment on which the application is executed. An application may be implemented using an application virtualization container, and the manifest may be provided with the container for the application. In one embodiment, if the machine image 640 also includes GPU requirements applicable to the entire instance 141C, then application-specific GPU requirements in an application manifest may override the general GPU requirements in the machine image. In one embodiment, the GPU requirements 630 may be determined using any suitable metadata external to the instance 141C. For example, a metadata repository accessible to the elastic graphics service 610 may maintain information mapping particular applications to particular GPU requirements for one or more clients of the provider network 100.

As shown in the example of FIG. 6C, the GPU requirements 630 may be provided by an application itself during its execution. In one embodiment, the elastic graphics service 110 may offer an API associated with the virtual GPU selection 610. An application 620A that has been written to take advantage of the virtual GPU selection API may, after launch, make a call to the API and specify one or more GPU requirements 630 (potentially including a direct indication of the selected GPU class 635). In one embodiment, such a call may be made to the graphics driver 321 that implements aspects of the functionality associated with the elastic graphics service 110. The graphics driver may forward the GPU requirements 630 to the elastic graphics service 110 for selection and attachment of a suitable virtual GPU that is specific to the calling application.

In one embodiment, programmatic analysis of an application may determine the GPU requirements 630 associated with the application. The application analysis may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time.

An application-specific virtual GPU may be selected and/or attached dynamically or on demand. In one embodiment, the GPU requirements for an application may be determined or provided by the instance 141C to the elastic graphics service 110 only after the application is launched, e.g., after execution of the application is initiated. Similarly, an application-specific virtual GPU may not be selected, provisioned, and/or attached for use by the application until the application is executing. In one embodiment, the GPU requirements for an application may be determined or provided by the instance 141C to the elastic graphics service 110 before the application is launched, but an application-specific virtual GPU may not be selected, provisioned, and/or attached for use by the application until the application is executing. In one embodiment, the launching and/or execution of applications 620A-620N may be monitored by a suitable component of the virtual compute instance 141C, and that component may initiate the selection and/or attachment of application-specific virtual GPUs. In one embodiment, an application-specific virtual GPU may be selected and/or attached based (at least in part) on one or more operations or tasks performed or requested by the corresponding application during its execution. For example, an application-specific virtual GPU may be selected and/or attached in response to a call made by the application to a graphics driver 321 on the instance 141C, e.g., to request that one or more graphics operations or general-purpose GPU computing operations be performed. In one embodiment, an application-specific virtual GPU may be selected and/or attached in response to the first such call made by an application that is associated with virtual GPU requirements. In one embodiment, a virtual GPU may be attached based (at least in part) on a specific data set loaded into the application, e.g., according to an API call made by the application. Similarly, the virtual GPU may potentially be detached based (at least in part) on the data set being removed from application memory. By provisioning virtual GPUs only when needed, GPU resources in the provider network 100 may be conserved. Additionally, fees for use of virtual GPUs (e.g., fees per unit of time) may be minimized for clients that operate virtual compute instances using attached virtual GPUs.

In some circumstances, the class of virtual GPU dictated by the GPU requirements for the application may not be available. The virtual GPU class may not be available for technical reasons (e.g., during a busy period) or for business reasons (e.g., the selected GPU class is more expensive than permitted by an agreement between the user and the provider network 100). In such circumstances, the elastic graphics service 110 may either return an indication of failure or attempt to reconcile the difference between the requested virtual GPU class and the available virtual GPUs. If a virtual GPU of a lesser class is available, the elastic graphics service 110 may prompt the user for approval. In one embodiment, the elastic graphics service 110 may seek user approval to wait until the requested virtual GPU class is available at an acceptable cost.

Figure 7:
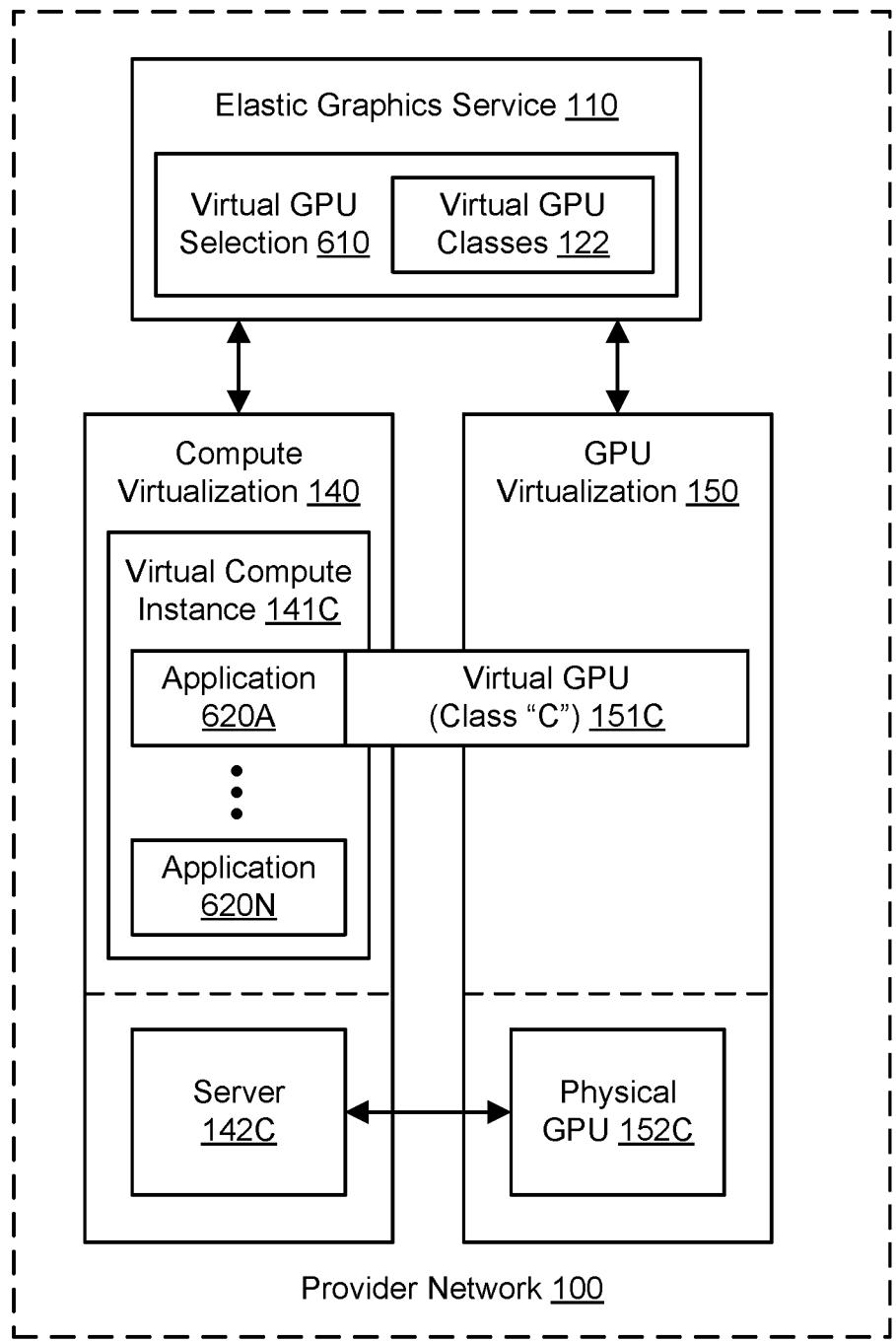
FIG. 7 illustrates an example system environment for dynamic and application-specific virtualized graphics processing, including dynamic attachment of a single application-specific virtual GPU for an application on a virtual compute instance, according to one embodiment.

FIG. 7 illustrates an example system environment for dynamic and application-specific virtualized graphics processing, including dynamic attachment of a single application-specific virtual GPU for an application on a virtual compute instance, according to one embodiment. In the example of FIG. 7, the elastic graphics service has selected a virtual GPU class "C" for use with a specific application 620A, e.g., based (at least in part) on GPU requirements associated with that application. A virtual GPU 151C of the selected class "C" may be provisioned by the elastic graphics service 110 from a pool of available resources of the provider network, e.g., from a pool of available physical GPU resources. The physical GPU 152C used to implement the selected virtual GPU may satisfy the one or more GPU requirements.

The virtual compute instance 141C may be implemented by the compute virtualization functionality 140 using suitable physical resources such as a server 142C, and the provisioned virtual GPU 151C may be implemented by the GPU virtualization functionality 150 using suitable physical resources such as a physical GPU 152C. As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141C with the attached virtual GPU 151C, a server 142C may communicate with a physical GPU 152C, e.g., over a network. The physical GPU 152C may be located in a different computing device than the server 142C, e.g., in a graphics server. Even though they may be implemented using separate hardware, the virtual GPU 151C may be said to be attached to the virtual compute instance 141C, or the virtual compute instance may be said to include the virtual GPU. The virtual GPU 151C may be installed on a device that may reside in various locations relative to the physical GPU 152C, e.g., on the same rack, the same switch, the same room, and/or other suitable locations on the same network.

The virtual compute instance 141C may be configured to execute the application 620A that has the application-specific virtual GPU 151C. Execution of the application 620A may include using the virtual GPU 151C to generate output based on data supplied to the virtual GPU by the application. The virtual GPU 151C may be attached to the virtual compute instance 141C specifically for use by the particular application 620A. The application-specific virtual GPU 151C may be dedicated to the particular application 620A, and other applications running on the virtual compute instance 141C may have no access to this particular virtual GPU 151C. The output produced by the application-specific virtual GPU 151C, potentially including graphical output, may be provided to the virtual compute instance 141C or to a client device such as client device 180A. In one embodiment, the virtual GPU 151C may be used by the application 620A for both graphics processing and GPGPU computing purposes.

The virtual GPU 151C may be implemented in a graphics server 420. In one embodiment, the graphics server 420 may offer virtualized graphics processing (or virtualized GPGPU compute processing) to a plurality of different clients at a given time. The different clients may execute different applications that take advantage of the same virtual GPU 151C in the multi-tenant graphics server, e.g., using multiple application contexts in the graphics server. The graphics server may switch between contexts depending on the application currently using the virtual GPU.

In one embodiment, an existing virtual GPU may be attached to the virtual compute instance 141C when a request for attachment of an application-specific virtual GPU is generated by the instance. The existing virtual GPU may be application-specific or application-nonspecific. The elastic graphics service 110 may determine that the existing virtual GPU is sufficient to satisfy the GPU requirements 630 associated with the new request. In such a scenario, the elastic graphic service 110 and/or graphics driver 321 may not attach a new virtual GPU but may instead route API calls from the application associated with the new request to the existing virtual GPU. In some embodiments, the existing virtual GPU may then be used by multiple applications on the same instance 141C or on multiple instances.

Figure 8:
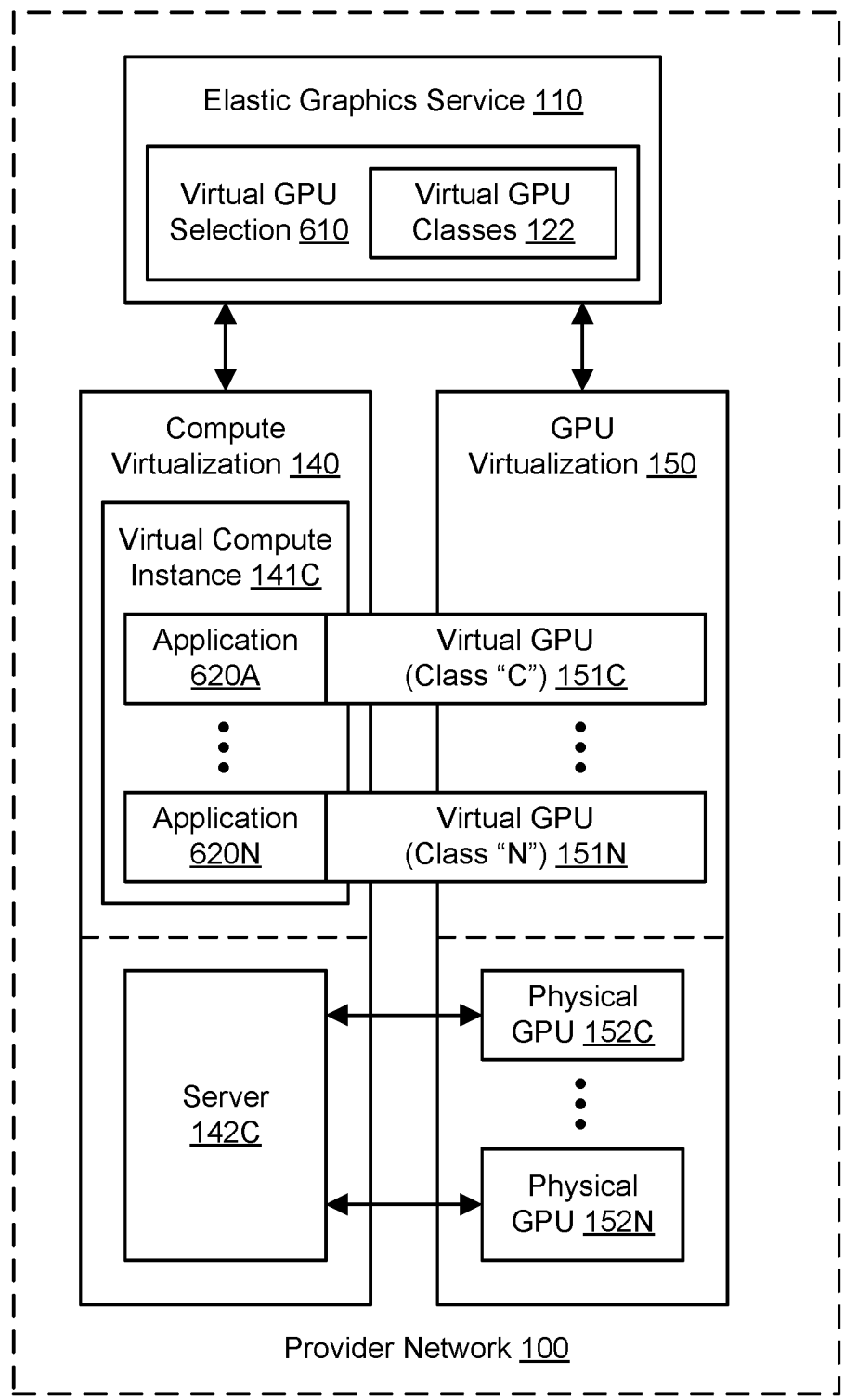
FIG. 8 illustrates an example system environment for dynamic and application-specific virtualized graphics processing, including dynamic attachment of different classes of application-specific virtual GPUs for different applications on the same virtual compute instance, according to one embodiment.

FIG. 8 illustrates an example system environment for dynamic and application-specific virtualized graphics processing, including dynamic attachment of different classes of application-specific virtual GPUs for different applications on the same virtual compute instance, according to one embodiment. In the example of FIG. 8, the elastic graphics service has again selected a virtual GPU class "C" for use with a specific application 620A, e.g., based (at least in part) on GPU requirements associated with that application. A virtual GPU 151C of the selected class "C" may be provisioned by the elastic graphics service 110 from a pool of available resources of the provider network, e.g., from a pool of available physical GPU resources. The physical GPU 152C used to implement the selected virtual GPU 151C may satisfy the one or more GPU requirements associated with the application 620A. Also in the example of FIG. 8, the elastic graphics service has selected a virtual GPU class "N" for use with another specific application 620N, e.g., based (at least in part) on GPU requirements associated with that application. A virtual GPU 151N of the selected class "N" may be provisioned by the elastic graphics service 110 from a pool of available resources of the provider network, e.g., from a pool of available physical GPU resources. The physical GPU 152N used to implement the selected virtual GPU 151N may satisfy the one or more GPU requirements associated with the application 620N. The virtual GPU 151C of class "C" may differ from the virtual GPU 151N of class "N" in one or more characteristics, such as hardware characteristics, vendor of origin, associated application programming interface (API) (e.g., a graphics API for accelerated graphics processing such as OpenGL or Direct3D or a general-purpose GPU computing API such as OpenCL), and/or other relevant attributes.

The provisioned virtual GPU 151C may be implemented by the GPU virtualization functionality 150 using suitable physical resources such as a physical GPU 152C, and the provisioned virtual GPU 151N may be implemented by the GPU virtualization functionality using suitable physical resources such as a physical GPU 152N. To implement the virtual compute instance 141C with the attached virtual GPU 151C and the attached virtual GPU 151N, a server 142C may communicate with both a physical GPU 152C and a physical GPU 142N, e.g., over a network. The physical GPU 152C and the physical GPU 152N may be located in one or more different computing devices than the server 142C, such as one or more graphics servers. The virtual GPU 151N may be installed on a device that may reside in various locations relative to the physical GPU 152N, e.g., on the same rack, the same switch, the same room, and/or other suitable locations on the same network.

In various embodiments, any suitable technique(s) may be used to offload graphics processing from the virtual compute instance 141C to the physical GPUs used to implement the application-specific virtual GPUs 151C-151N. In one embodiment, an API shim may intercept calls to a graphics API and marshal the calls over a network to one or more external computing devices that include the physical GPUs 152C-152N. The API shim may be application-specific, such that an instance of a dynamic link library (DLL) for graphics processing may be opened in the context of the process for each application that has a dedicated virtual GPU. The DLL may connect to a particular one of the virtual GPUs 151C-151N and provide exclusive access to that virtual GPU on behalf of the corresponding application. The applications 620A-620N may be implemented using application virtualization containers, and the API shim layer may be built into the container for an application.

The virtual compute instance 141C may be configured to execute the application 620A that has the application-specific virtual GPU 151C; execution of the application 620A may include using the virtual GPU 151C to generate output based on data supplied to the virtual GPU by the application. Similarly, the virtual compute instance 141C may be configured to execute the application 620N that has the application-specific virtual GPU 151N; execution of the application 620N may include using the virtual GPU 151N to generate output based on data supplied to the virtual GPU by the application. In one embodiment, the application 620A may use the virtual GPU 151C in a manner that is substantially concurrent with the application 620N using the virtual GPU 151N. The virtual GPU 151C may be attached to the virtual compute instance 141C exclusively for use by the particular application 620A, and the virtual GPU 151N may be attached to the virtual compute instance 141C exclusively for use by the particular application 620N. The output produced by the application-specific virtual GPU 151C and the application-specific virtual GPU 151N, potentially including graphical output, may be provided to the virtual compute instance 141C or to a client device such as client device 180A.

Figure 9:
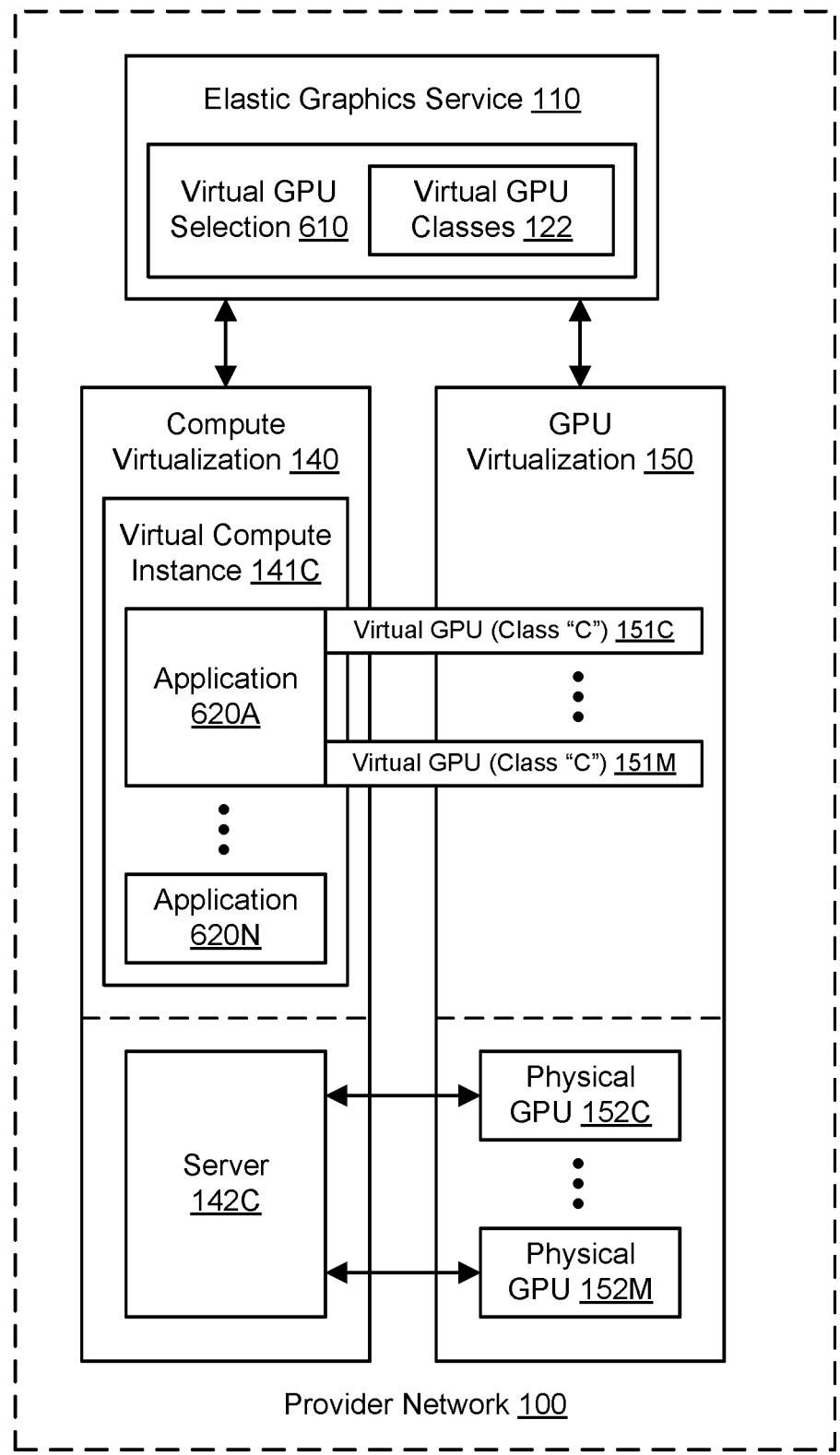
FIG. 9 illustrates an example system environment for dynamic and application-specific virtualized graphics processing, including dynamic attachment of multiple application-specific virtual GPUs for the same application on the same virtual compute instance, according to one embodiment.

FIG. 9 illustrates an example system environment for dynamic and application-specific virtualized graphics processing, including dynamic attachment of multiple application-specific virtual GPUs for the same application on the same virtual compute instance, according to one embodiment. In the example of FIG. 9, the elastic graphics service 110 has selected a virtual GPU class "C" for use with a specific application 620A, e.g., based (at least in part) on GPU requirements associated with that application. As discussed above, a virtual GPU 151C of the selected class "C" may be provisioned by the elastic graphics service 110 from a pool of available resources of the provider network, e.g., from a pool of available physical GPU resources. The physical GPU 152C used to implement the selected virtual GPU may satisfy the one or more GPU requirements. In one embodiment, the elastic graphics service 110 has also provisioned one or more additional virtual GPUs of the same class "C," such as virtual GPU 151M, for use by the same application 620A.

The additional virtual GPU 151M may be implemented by the GPU virtualization functionality 150 using suitable physical resources such as a physical GPU 152M. To implement the virtual compute instance 141C with the attached virtual GPU 151C and the attached virtual GPU 151M, the server 142C may communicate with both the physical GPU 152C and the physical GPU 152M, e.g., over a network. The physical GPU 152C and physical GPU 152M may be located in a different computing device than the server 142C, such as one or more graphics servers. The virtual GPU 151M may be installed on a device that may reside in various locations relative to the physical GPU 152M, e.g., on the same rack, the same switch, the same room, and/or other suitable locations on the same network.

The virtual compute instance 141C may be configured to execute the application 620A that has the application-specific virtual GPUs 151C through 151M. Execution of the application 620A may include using the virtual GPUs 151C through 151M to generate output based on data supplied to the virtual GPU by the application. The virtual GPU 151C and virtual GPU 151M may be attached to the virtual compute instance 141C specifically for use by the particular application 620A. The output produced by the application-specific virtual GPU 151C and virtual GPU 151M may be provided to the virtual compute instance 141C or to a client device such as client device 180A. In one embodiment, the application 620A may use the virtual GPU 151M in a manner that is substantially concurrent with the application using the virtual GPU 151C. In one embodiment, the virtual GPU 151M may be attached to the instance 141C after the virtual GPU 151C has already been used by the application 620A. For example, one or more additional virtual GPUs may be attached if the existing workload becomes too much for the original virtual GPU 151C. In one embodiment, one of the virtual GPUs 151C-151M may be used by the application 620A for graphics processing, and another of the virtual GPUs 151C-151M may be used by the application for GPGPU computing purposes. In one embodiment, two or more virtual GPUs that vary in their virtual GPU class or hardware characteristics may be used by the same application, e.g., one for graphics processing based on one set of GPU requirements and another for GPGPU computing based on another set of GPU requirements.

In one embodiment, two or more virtual GPUs 151C-151M may be dedicated to a particular application 620A if no single virtual GPU can meet the requirements of the application. As another example, two or more virtual GPUs 151C-151M may be dedicated to a particular application 620A if no single virtual GPU that meets the requirements of the application is currently available in the provider network 100. As yet another example, two or more virtual GPUs 151C-151M may be dedicated to a particular application 620A if no single virtual GPU that meets the requirements of the application is currently available within a budget specified by a client.

Any suitable technique(s) may be used to permit a single application 620A to use multiple virtual GPUs 151C-151M. In one embodiment, input data from the application 620A may be broadcast to all of the application-specific virtual GPUs 151C-151M, and the virtual GPUs may operate in a concurrent manner on different portions of the input data. The broadcasting may be performed using an API shim. The workload may then be divided among the virtual GPUs 151C-151M, e.g., based on the relative capabilities of the virtual GPUs. For example, each of the virtual GPUs 151C-151M may be dedicated to a particular region of the display, and the output from the virtual GPUs may be combined to generate each frame. As another example, each of the virtual GPUs 151C-151M may be dedicated to a particular frame in a sequence (e.g., every other frame for two virtual GPUs), and the output from the virtual GPUs may be combined to generate a sequence of frames. As yet another example, the virtual GPUs 151C-151M may be used for general-purpose GPU computing tasks, e.g., as implemented using the OpenCL API.

Figure 10:
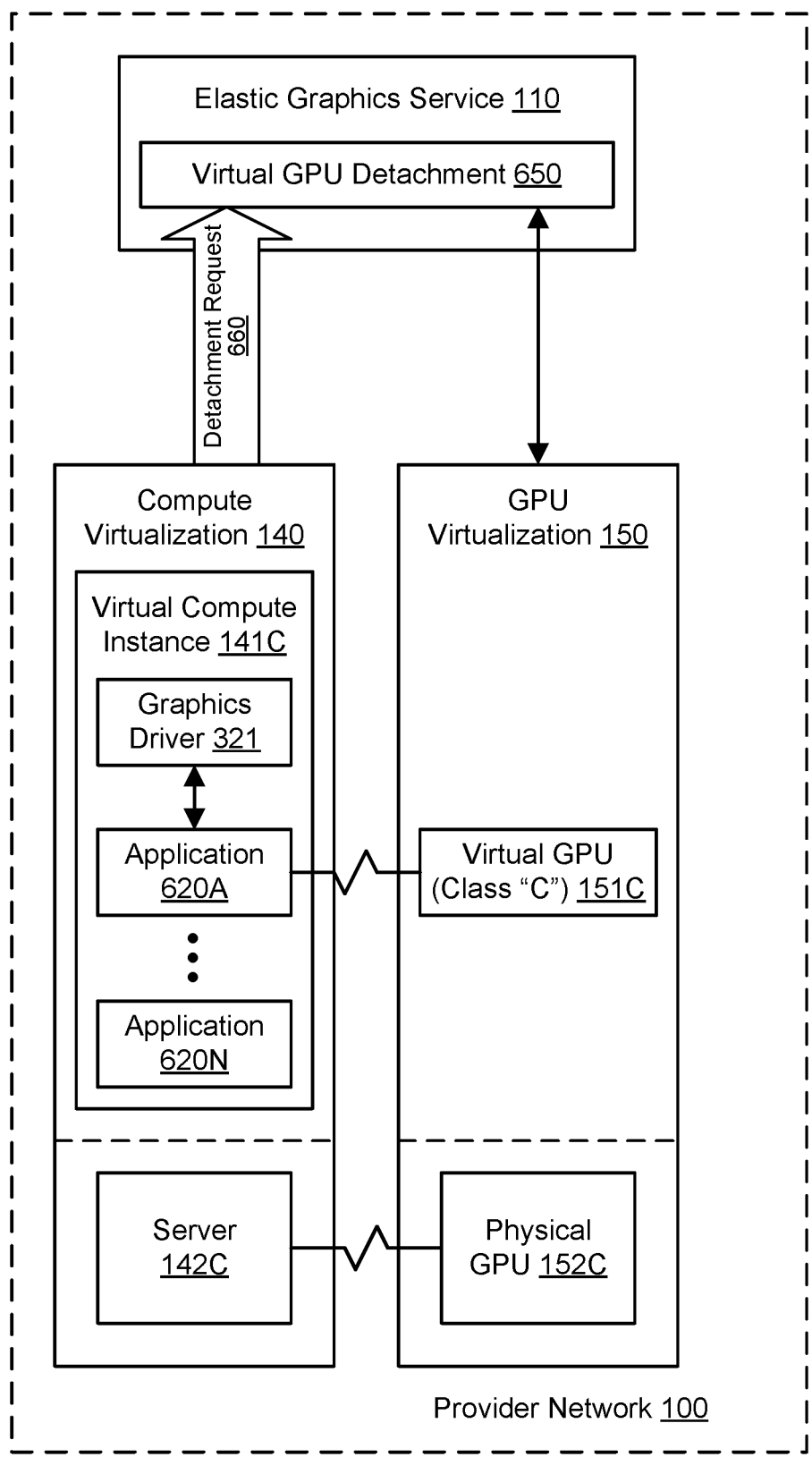
FIG. 10 illustrates an example system environment for dynamic and application-specific virtualized graphics processing, including dynamic detachment of an application-specific virtual GPU from a virtual compute instance, according to one embodiment.

FIG. 10 illustrates an example system environment for dynamic and application-specific virtualized graphics processing, including dynamic detachment of an application-specific virtual GPU from a virtual compute instance, according to one embodiment. An application-specific virtual GPU may be detached from a virtual compute instance in a dynamic manner, e.g., based on termination of the corresponding application or lack of use of the virtual GPU for a period of time. As shown in the example of FIG. 10, execution of the application 620A may be monitored by a suitable component of the virtual compute instance 141C, such as the graphics driver 321 that implements aspects of the functionality of the elastic graphics service 110. In one embodiment, when execution of the application 620A is in the process of being terminated, the application may send a suitable command to the graphics driver 321, and the driver (or another component of the instance 141C) may send a detachment request 660 to a virtual GPU detachment component 650 of the elastic graphics service 110. In one embodiment, when execution of the application 620A is terminated, the graphics driver 321 (or another component of the instance 141C) may detect the termination and send a detachment request 660 to the virtual GPU detachment component 650 of the elastic graphics service 110. In one embodiment, when the application 620A fails to make use of the application-specific virtual GPU 151C for a configurable period of time, the graphics driver 321 (or another component of the instance 141C) may send a detachment request 660 to the virtual GPU detachment component 650 of the elastic graphics service 110. The detachment request 660 may include any suitable data or metadata, potentially including an identifier of the virtual GPU 151C whose detachment is sought.

Upon receipt of the detachment request 660, the virtual GPU detachment component 650 (or another suitable component of the elastic graphics service 110 or provider network 100) may detach the application-specific virtual GPU 151C and return the underlying physical GPU 152C to a pool of available resources. The detached virtual GPU 151C may no longer be usable by the virtual compute instance 141C unless it is reprovisioned and reattached. By automatically and dynamically detaching virtual GPUs when not needed, GPU resources in the provider network 100 may be conserved. Additionally, fees for use of virtual GPUs (e.g., fees per unit of time) may be minimized for clients that operate virtual compute instances using attached virtual GPUs.

Figure 11:
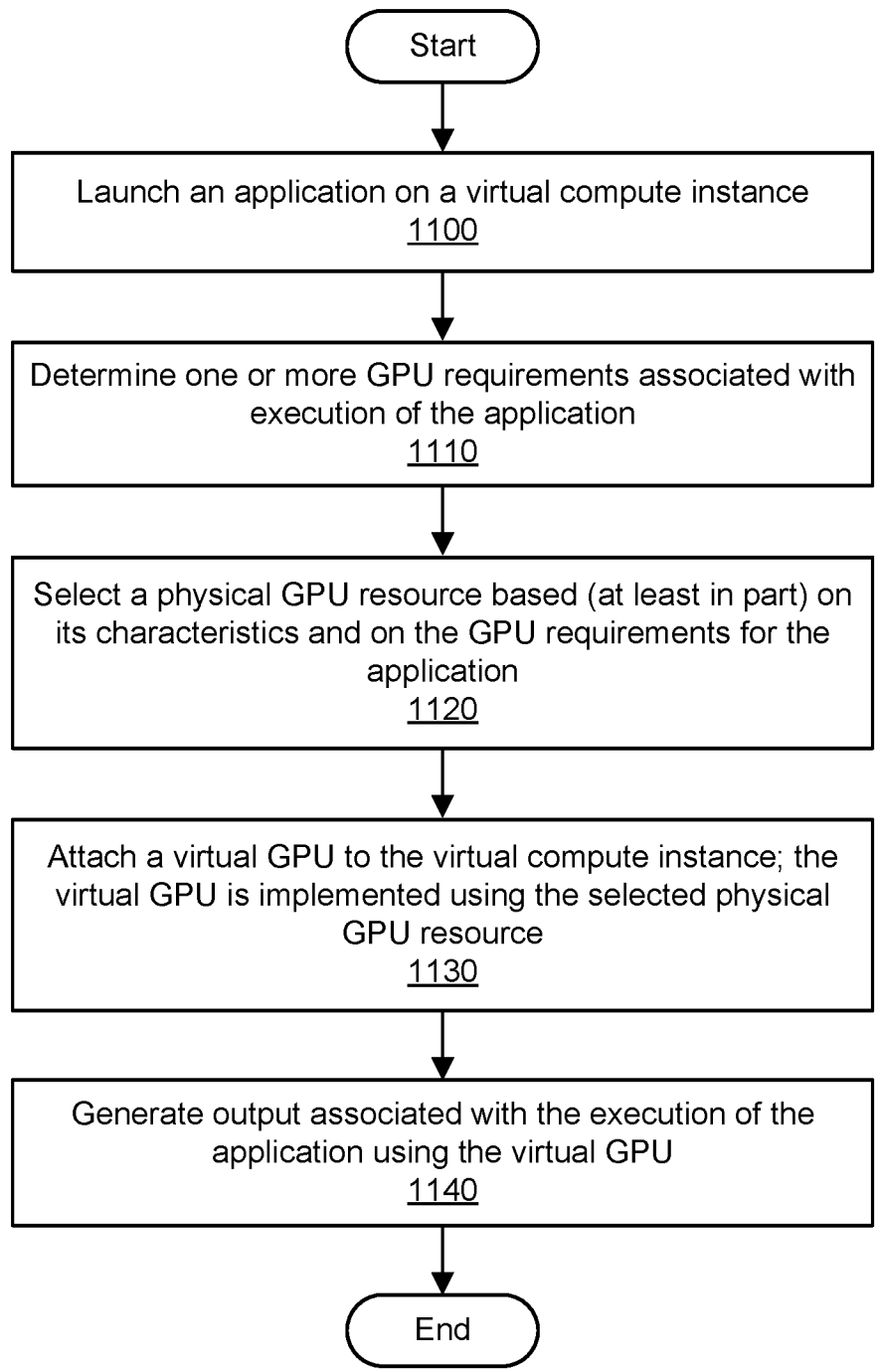
FIG. 11 is a flowchart illustrating a method for dynamic attachment of an application-specific virtual GPU based (at least in part) on GPU requirements associated with an application, according to one embodiment.

FIG. 11 is a flowchart illustrating a method for dynamic attachment of an application-specific virtual GPU based (at least in part) on GPU requirements associated with an application, according to one embodiment. As shown in 1100, an application may be launched on a virtual compute instance. At the time of application launch, the virtual compute instance may not have an attached virtual GPU that is specific or exclusive to the newly launched application. In some embodiments, however, the virtual compute instance may already have one or more attached virtual GPUs that are specific to other applications or intended for general use by any applications on the instance. Launching the application may also be referred to as initiating the execution of the application.

As shown in 1110, one or more GPU requirements may be determined that are associated with execution of the application. The GPU requirements may specify one or more of the virtual GPU classes offered by the provider network, one or more hardware characteristics of a GPU (e.g., a minimum amount of memory), a vendor of a GPU, a desired API for the GPU, and/or other relevant attributes. The GPU requirements may be expressed as minimums, maximums, threshold values, and/or ranges of values. In various embodiments, the GPU requirements associated with a particular application may be determined in various ways. In various embodiments, for example, the GPU requirements may be included in a machine image that is used to launch the virtual compute instance, the GPU requirements may be included in an application manifest associated with the application, or the GPU requirements may be provided by the application itself during its execution (e.g., using a suitable API).

As shown in 1120, a physical GPU resource may be selected based (at least in part) on its characteristics and also based (at least in part) on the GPU requirements for the application. For example, a physical GPU resource may be selected that meets or exceeds any minimum performance requirements associated with the application, has one or more hardware features associated with a particular vendor, is accessible using a particular API (e.g., OpenGL, Direct3D, Vulkan, OpenCL, and so on), and/or has other minimum characteristics indicated in the GPU requirements. The selected physical GPU resource may be associated with one of several virtual GPU classes offered in the provider network. The virtual GPU classes may be characterized by their differing computational resources for graphics processing, memory resources for graphics processing, and/or other suitable descriptive characteristics.

As shown in 1130, a virtual GPU may be attached to the virtual compute instance, and the virtual GPU may be implemented using the selected physical GPU resource. The virtual GPU may be referred to as an application-specific virtual GPU. In one embodiment, the elastic graphics service may interact with one or more other services or functionalities of a provider network, such as a compute virtualization functionality and/or GPU virtualization functionality, to attach the virtual GPU to the instance. The virtual compute instance may be implemented using central processing unit (CPU) resources and memory resources of a server. The physical GPU may be attached to a different computing device than the computing device that provides the CPU resources for the virtual compute instance. The selected physical GPU may be accessible to the server over a network. The virtual GPU may be said to be attached to the virtual compute instance, or the virtual compute instance may be said to include the virtual GPU. The operations shown in 1110, 1120, and 1130 may be performed automatically and programmatically, e.g., by an elastic graphics service, and not necessarily based on user input specifically directing or prompting such operations.

In one embodiment, the application-specific virtual GPU may not be selected, provisioned, and/or attached for use by the application until the application is executing. In one embodiment, the application-specific virtual GPU may be selected and/or attached based (at least in part) on one or more operations or tasks performed or requested by the corresponding application during its execution. For example, the application-specific virtual GPU may be selected and/or attached in response to a call made by the application to a graphics driver on the instance, e.g., to request that one or more graphics operations or general-purpose GPU computing operations be performed. In one embodiment, the application-specific virtual GPU may be selected and/or attached in response to the first such call made by the application.

As shown in 1140, output associated with the execution of the application may be generated by the virtual GPU. In one embodiment, the application may generate graphics instructions that are sent to the virtual GPU for execution using the virtual GPU. In one embodiment, the application-specific virtual GPU may be used by the corresponding application to the exclusion of any other applications resident or executing on the virtual compute instance. Additional applications on the virtual compute instance may use different application-specific virtual GPUs, and the application-specific virtual GPUs may vary in graphics processing capabilities based on the varying requirements of the applications.

Figure 12:
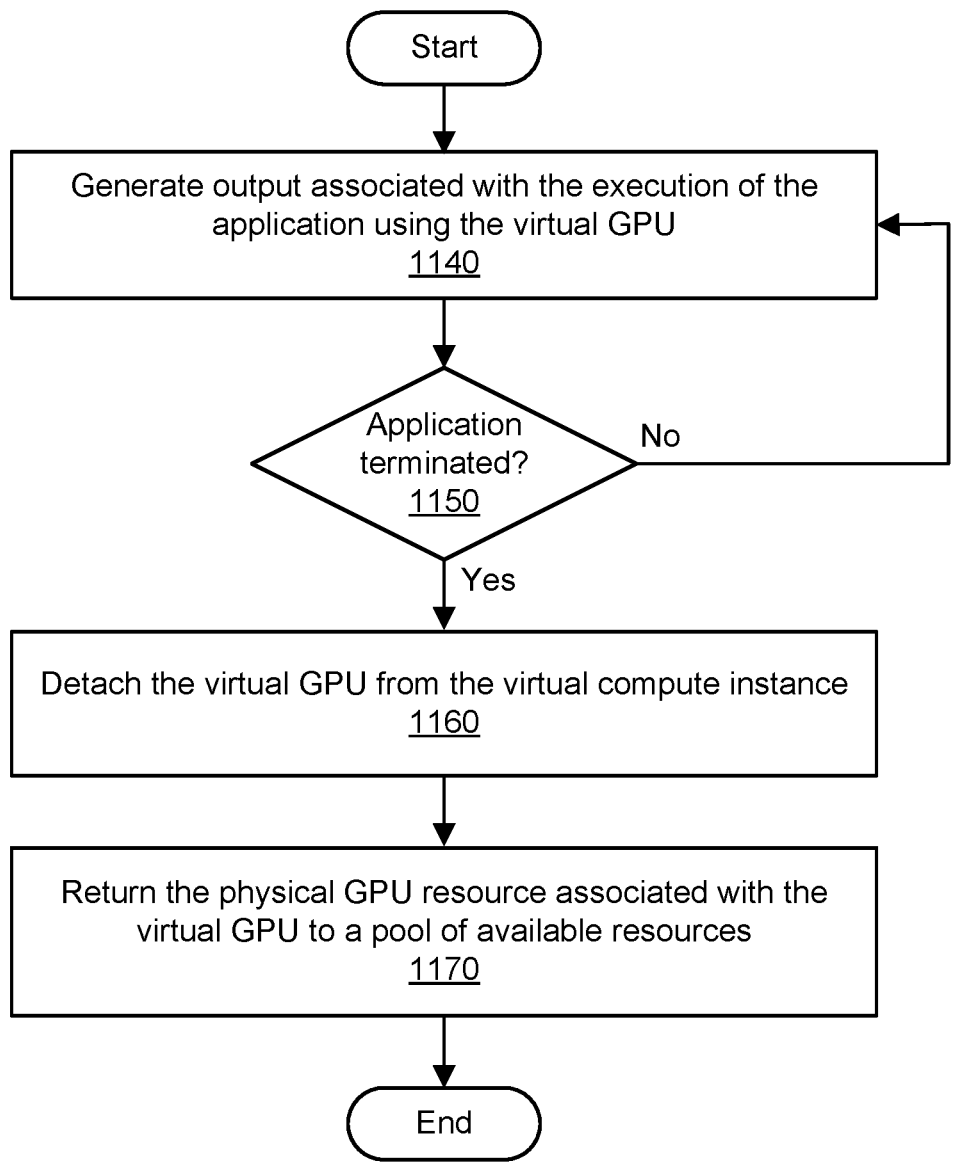
FIG. 12 is a flowchart illustrating a method for dynamic detachment of an application-specific virtual GPU based (at least in part) on termination of the application, according to one embodiment.

FIG. 12 is a flowchart illustrating a method for dynamic detachment of an application-specific virtual GPU based (at least in part) on termination of the application, according to one embodiment. As discussed above and as shown in 1140, output associated with the execution of an application may be generated by an application-specific virtual GPU associated with that application. As shown in 1150, it may be determined whether the application has terminated. In one embodiment, execution of the application may be monitored by a suitable component of the virtual compute instance, such as a graphics driver that implements aspects of the functionality of the elastic graphics service. In one embodiment, when execution of the application is terminated, the application may send a suitable command to the graphics driver, and the driver (or another component of the instance) may send a detachment request to the elastic graphics service. In one embodiment, when execution of the application is terminated, the graphics driver (or another component of the instance) may detect the termination and send a detachment request to the elastic graphics service.

As shown in 1160, the application-specific virtual GPU may be detached from the virtual compute instance. As shown in 1170, the physical GPU resource associated with the detached virtual GPU may be deprovisioned and/or returned to a pool of available resources of a provider network. The detached virtual GPU may no longer be usable by the virtual compute instance unless it is reprovisioned and reattached. The operations shown in 1150, 1160, and 1170 may be performed automatically and programmatically, e.g., by an elastic graphics service, and not necessarily based on user input specifically directing or prompting such operations. By automatically and dynamically detaching virtual GPUs when not needed, GPU resources in the provider network may be conserved. Additionally, fees for use of virtual GPUs (e.g., fees per unit of time) may be minimized for clients that operate virtual compute instances using attached virtual GPUs.

Figure 13:
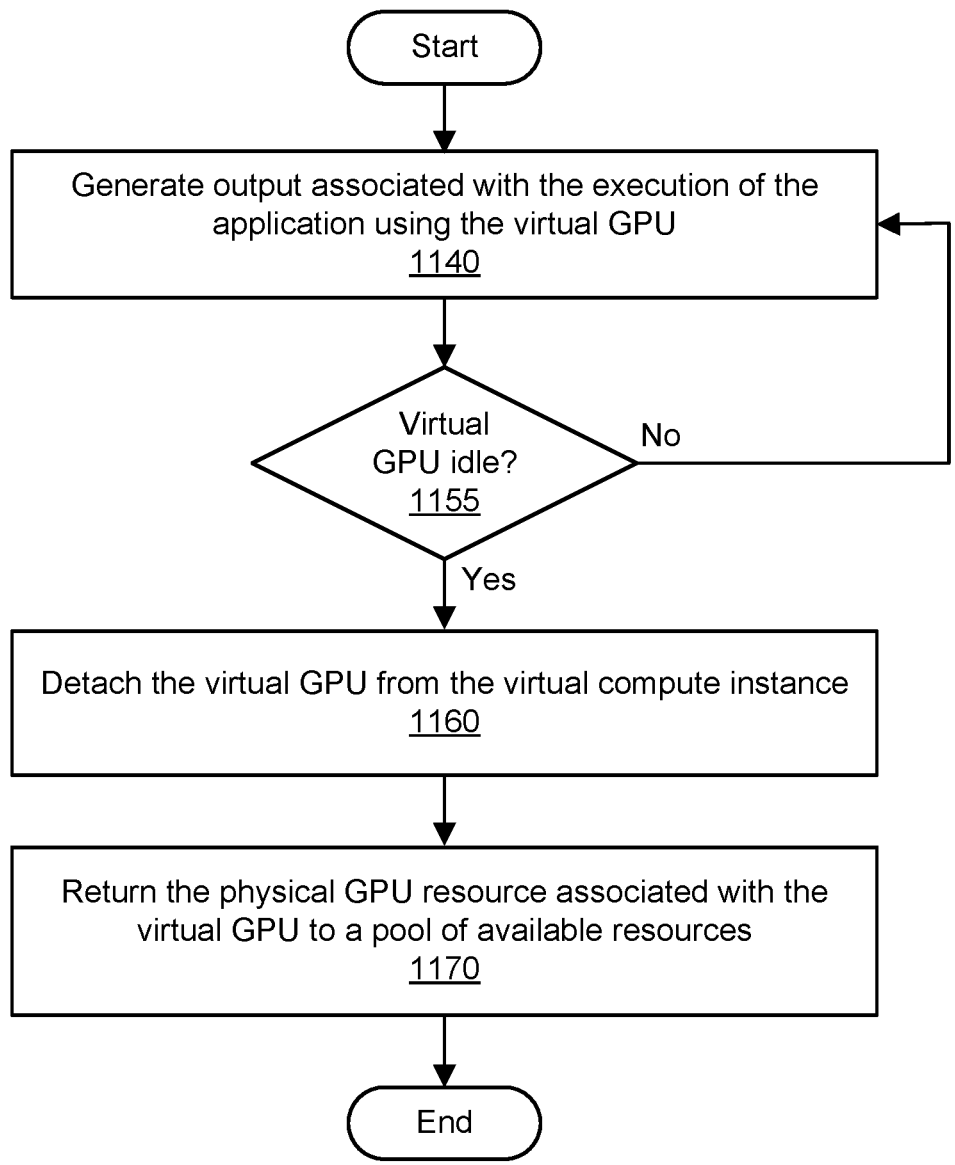
FIG. 13 is a flowchart illustrating a method for dynamic detachment of an application-specific virtual GPU based (at least in part) on idleness of the virtual GPU, according to one embodiment.

FIG. 13 is a flowchart illustrating a method for dynamic detachment of an application-specific virtual GPU based (at least in part) on idleness of the virtual GPU, according to one embodiment. As discussed above and as shown in 1140, output associated with the execution of an application may be generated by an application-specific virtual GPU associated with that application. As shown in 1155, it may be determined whether the application-specific virtual GPU has been unused for a configurable period of time, e.g., whether the virtual GPU has been idle for a period of time. In one embodiment, execution of the application and/or use of the application-specific virtual GPU may be monitored by a suitable component of the virtual compute instance, such as a graphics driver that implements aspects of the functionality of the elastic graphics service. In one embodiment, when the application fails to make use of the application-specific virtual GPU for a threshold duration, the graphics driver (or another component of the instance) may send a detachment request to the elastic graphics service.

As shown in 1160, the application-specific virtual GPU may be detached from the virtual compute instance. As shown in 1170, the physical GPU resource associated with the detached virtual GPU may be deprovisioned and/or returned to a pool of available resources of a provider network. The detached virtual GPU may no longer be usable by the virtual compute instance unless it is reprovisioned and reattached. The operations shown in 1155, 1160, and 1170 may be performed automatically and programmatically, e.g., by an elastic graphics service, and not necessarily based on user input specifically directing or prompting such operations. By automatically and dynamically detaching virtual GPUs when not needed, GPU resources in the provider network may be conserved. Additionally, fees for use of virtual GPUs (e.g., fees per unit of time) may be minimized for clients that operate virtual compute instances using attached virtual GPUs.

Illustrative Computer System

In at least some embodiments, a computer system that implements a portion or all of one or more of the technologies described herein may include a computer system that includes or is configured to access one or more computer-readable media. FIG. 14 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:
1. A system, comprising:
a pool of available physical graphics processing unit (GPU) resources in a multi-tenant provider network, wherein at least a portion of the available physical GPU resources vary in one or more hardware characteristics;

a virtual compute instance comprising a GPU interface configured to access a graphics service over a network using a remoting protocol comprising encapsulated graphics application programming interface (API) commands, wherein the virtual compute instance is implemented using central processing unit (CPU) resources and memory resources of a server in the multi-tenant provider network, and wherein the virtual compute instance is configured to:
  initiate execution of an application; and
one or more computing devices configured to implement the graphics service, wherein the one or more computing devices are different than the server, and wherein the graphics service is configured to:
  select a physical GPU resource from the pool of available physical GPU resources based at least in part on one or more GPU requirements associated with the execution of the application; and
  attach a virtual GPU to the virtual compute instance based at least in part on initiation of the execution of the application, wherein the virtual GPU is implemented using the physical GPU resource selected from the pool and accessible to the server using the remoting protocol over the network, and wherein the virtual GPU is configured to generate output responsive to encapsulated graphics API commands associated with the execution of the application on the virtual compute instance.

2. The system as recited in claim 1, wherein the graphics service is further configured to:
  detach the virtual GPU from the virtual compute instance based at least in part on termination of the execution of the application on the virtual compute instance; and
  return the physical GPU resource associated with the virtual GPU to the pool of available physical GPU resources.

3. The system as recited in claim 1, wherein the one or more GPU requirements are specified by the application during the execution of the application.

4. The system as recited in claim 1, wherein the one or more GPU requirements are associated with a machine image used in launching the virtual compute instance.

5. A computer-implemented method, comprising:
  initiating execution of an application on a virtual compute instance comprising a graphics processing unit (GPU) interface configured to access a GPU resource over a network using a remoting protocol comprising encapsulated graphics application programming interface (API) commands;
  determining one or more GPU requirements associated with the execution of the application;
  selecting a physical GPU resource from a pool of available physical GPU resources based at least in part on the one or more GPU requirements; and
  attaching a virtual GPU to the virtual compute instance after initiation of the execution of the application, wherein the virtual GPU is implemented using the physical GPU resource selected from the pool and accessible to the virtual compute instance using the encapsulated graphics API commands of the remoting protocol over a network.

6. The method as recited in claim 5, further comprising:
  detecting termination of the execution of the application on the virtual compute instance;
  detaching the virtual GPU from the virtual compute instance based at least in part on the termination of the execution of the application; and
  returning the physical GPU resource associated with the virtual GPU to the pool of available physical GPU resources.

7. The method as recited in claim 5, wherein the one or more GPU requirements comprise one or more hardware characteristics of a physical GPU.

8. The method as recited in claim 5, wherein the one or more GPU requirements comprise an identification of a vendor of a physical GPU.

9. The method as recited in claim 5, wherein the one or more GPU requirements are specified by the application during the execution of the application.

10. The method as recited in claim 5, wherein the one or more GPU requirements are associated with a machine image used in launching the virtual compute instance.

11. The method as recited in claim 5, further comprising:
  initiating execution of an additional application on the virtual compute instance, wherein the execution of the additional application is initiated after the execution of the application is terminated;
  determining one or more additional GPU requirements associated with the execution of the additional application, wherein the additional GPU requirements differ at least in part from the GPU requirements;
  selecting an additional physical GPU resource from the pool of available physical GPU resources based at least in part on the one or more additional GPU requirements; and
  attaching an additional virtual GPU to the virtual compute instance after initiation of the execution of the additional application, wherein the additional virtual GPU is implemented using the additional physical GPU resource selected from the pool and accessible to the virtual compute instance over the network.

12. The method as recited in claim 5, further comprising:
  initiating execution of an additional application on the virtual compute instance;
  determining one or more additional GPU requirements associated with the execution of the additional application, wherein the additional GPU requirements differ at least in part from the GPU requirements;
  selecting an additional physical GPU resource from the pool of available physical GPU resources based at least in part on the one or more additional GPU requirements; and
  attaching an additional virtual GPU to the virtual compute instance based at least in part on initiation of the execution of the additional application, wherein the additional virtual GPU is implemented using the additional physical GPU resource selected from the pool and accessible to the virtual compute instance over the network, and wherein output of the additional virtual GPU associated with the execution of the additional application is generated concurrently with output of the virtual GPU associated with the execution of the application.

13. The method as recited in claim 5, further comprising:
  selecting an additional physical GPU resource from the pool of available physical GPU resources based at least in part on the one or more GPU requirements; and
  attaching an additional virtual GPU to the virtual compute instance during the execution of the application, wherein the additional virtual GPU is implemented using the additional physical GPU resource selected from the pool and accessible to the virtual compute instance over the network, and wherein output of the additional virtual GPU associated with the execution of the application is generated concurrently with output of the virtual GPU associated with the execution of the application.

14. A computer-readable storage medium storing program instructions computer-executable to perform:
- determining one or more graphics processing unit (GPU) requirements associated with execution of an application on a virtual compute instance, wherein the virtual compute instance is implemented using a server in a multitenant provider network and comprises a GPU interface configured to access a GPU resource over a network using a remoting protocol comprising encapsulated graphics application programming interface (API) commands;
- selecting a physical GPU resource from a pool of available physical GPU resources in the multi-tenant provider network based at least in part on the one or more GPU requirements;
- attaching a virtual GPU to the virtual compute instance during the execution of the application, wherein the virtual GPU is implemented using the physical GPU resource selected from the pool and accessible to the virtual compute instance using the remoting protocol over a network; and
- using the virtual GPU to generate output responsive to encapsulated graphics API commands associated with the execution of the application.

15. The computer-readable storage medium as recited in claim 14, wherein the program instructions are further computer-executable to perform:
- detecting termination of the execution of the application on the virtual compute instance;
- detaching the virtual GPU from the virtual compute instance based at least in part on the termination of the execution of the application; and
- returning the physical GPU resource associated with the virtual GPU to the pool of available physical GPU resources.

16. The computer-readable storage medium as recited in claim 14, wherein the one or more GPU requirements comprise one or more hardware characteristics of a physical GPU.

17. The computer-readable storage medium as recited in claim 14, wherein the one or more GPU requirements comprise an identification of an application programming interface (API) supported by a GPU.

18. The computer-readable storage medium as recited in claim 14, wherein the one or more GPU requirements are specified by the application during the execution of the application.

19. The computer-readable storage medium as recited in claim 14, wherein the one or more GPU requirements are determined by a graphics service external to the virtual compute instance, and wherein the physical GPU resource is selected by the graphics service.

20. The computer-readable storage medium as recited in claim 14, wherein the program instructions are further computer-executable to perform:
- initiating execution of an additional application on the virtual compute instance;
- determining one or more additional GPU requirements associated with the execution of the additional application, wherein the additional GPU requirements differ at least in part from the GPU requirements;
- selecting an additional physical GPU resource from the pool of available physical GPU resources based at least in part on the one or more additional GPU requirements; and
- attaching an additional virtual GPU to the virtual compute instance based at least in part on initiation of the execution of the additional application, wherein the additional virtual GPU is implemented using the additional physical GPU resource selected from the pool and accessible to the virtual compute instance over the network.

\* \* \* \* \*